United States Patent [19]

Delorme

[11] Patent Number: 5,030,117
[45] Date of Patent: Jul. 9, 1991

[54] DIGITAL GLOBAL MAP GENERATING SYSTEM

[76] Inventor: David M. Delorme, 356 Range Rd., Cumberland, Me. 04021

[21] Appl. No.: 469,877

[22] Filed: Jan. 24, 1990

Related U.S. Application Data

[62] Division of Ser. No. 101,315, Sep. 25, 1987.

[51] Int. Cl.$^5$ .............................................. G09B 29/00
[52] U.S. Cl. .................................... 434/130; 364/419; 434/153
[58] Field of Search ................ 434/150, 135, 153, 130; 364/419

[56] References Cited

U.S. PATENT DOCUMENTS

| | | | |
|---|---|---|---|
| 4,315,747 | 2/1982 | McBryde | 434/150 |
| 4,698,759 | 10/1987 | Eliason et al. | 434/153 X |
| 4,725,236 | 2/1988 | Neri Vela et al. | 434/153 |
| 4,773,861 | 9/1989 | Dufour | 434/135 |

FOREIGN PATENT DOCUMENTS

| | | | |
|---|---|---|---|
| 0210554 | 2/1987 | European Pat. Off. | |
| 0382592 | 8/1990 | European Pat. Off. | |
| 3511368 | 4/1987 | Fed. Rep. of Germany | 434/153 |
| 8802156 | 3/1988 | PCT Int'l Appl. | |

OTHER PUBLICATIONS

Proceedings of the IEEE 1986 National Aerospace and Electronics Conference, Naecon 1986, vol. 1, pp. 79–86, "An Efficient Data Hierarchy for Integrating Background Image Information in an Aircraft Map System".
The Computer Journal, vol. 30, No. 4, Aug. 1987, pp. 355–361, "A General PASCAL Program for Map Overlay of Quadtrees and Related Problems".
Proceedings Pattern Recognition, 1982 pp. 802–805, "Picture Understanding and Retrieving System of Weather Chart".
IEEE Transactions on Pattern Analysis and Machine Intelligence, vol. PAMI-6, No. 3, May 1984, pp. 365–369, "On Encoding Boundaries with Quadtrees".

Primary Examiner—Richard J. Apley
Assistant Examiner—Glenn Richman
Attorney, Agent, or Firm—Sughrue, Mion, Zinn, Macpeak & Seas

[57] ABSTRACT

A global mapping system which organizes mapping data into a hierarchy of successive magnitudes or levels for presentation of the mapping data with variable resolution, starting from a first or highest magnitude with lowest resolution and progressing to a last or lowest magnitude with highest resolution. The idea of this hierarchical structures can be likened to a pyramid with fewer stones or "tiles" at the top, and where each successive descending horizontal level or magnitude contains four times as many "tiles" as the level or magnitude directly above it. The top or first level of the pyramid contains 4 tiles, the second level contains 16 tiles, the third contains 64 tiles and so on, such that the base of a 16 magnitude or level pyramid would contain 4 to the 16th power or 4,294,967,296 tiles. This total includes "hyperspace" which is later clipped or ignored. Digital data corresponding to each of the separate data base tiles is stored in the database under a unique filename.

4 Claims, 9 Drawing Sheets

ILLUSTRATION OF POLAR COMPRESSION AT THE 8th MAGNITUDE

DIGITAL GLOBAL MAP GENERATING SYSTEM

This is a division of application Ser. No. 07/101,315, filed Sept. 25, 1987, pending.

BACKGROUND OF THE INVENTION

1. Technical Field

This invention relates to a new variable resolution global map generating system for structuring digital mapping data in a new data base structure, managing and controlling the digital mapping data according to new mapping data access strategies, and displaying the mapping data in a new map projection of the earth.

2. Background Art

Numerous approaches have been forwarded to provide improved geographical maps, for example:

U.S. Pat. No. 4,315,747, issued to McBryde on Feb. 16, 1982, describes a new map "projection" and intersecting array of coordinate lines known as the "graticule", which is a composite of two previously known forms of projection. In particular the equatorial portions of the world are represented by a fusiform equal area projection in which the meridian curves, if extended would meet at points at the respective poles, referred to as "pointed poles". In contrast, the polar regions of the world map are represented by a flat polar equal area projection in which the poles are depicted as straight horizontal lines with the meridians intersecting along its length. Thus, in a flat polar projection the meridian curves converge toward the poles but do not meet at a point and, instead, intersect a horizontal linear pole. The two component portions of the flat world map are joined where the parallels are of equal length. The composite is said to be "homolinear" because all of the meridian curves are similar curves, for example, sine, cosine or tangent curves, which merge where the two forms of projection are joined where the respective parallels are equal. The flat polar projections in the polar portions of the map provide a compromise with the Mercator cylinder projections, thereby greatly reducing distortion.

U.S. Pat. No. 1,050,596, issued to Bacon on Jan. 14, 1913, describes another composite projection for world maps and charts which uses a Mercator or cylindrical projection for the central latitudes of the earth and a convergent projection at the respective poles. In the central latitudes, the grids of the Mercator projection net or graticule are rectangular. In the polar regions, the converging meridians may be either straight or curved.

U.S. Pat. No. 1,620,413, issued to Balch on Dec. 14, 1926, discusses gnomic projections from a conformal sphere to a tangent plane and Mercator or cylindrical projections from the conformal sphere to a tangent cylinder. Balch is concerned with taking into account the non-spherical shape of the earth, and therefore, devises the so-called "conformal sphere" which represents the coordinates from the earth whose shape is actually that of a spheroid or ellipsoid of revolution, without material distortion.

U.S. Pat. No. 752,957, issued to Colas on Feb. 23, 1904, describes a map projection in which a map of the entire world is plotted or transcribed on an oval constructed from two adjacent side by side circles with arcs joining the two circles. The meridians are smooth curves equally spaced at the equator, while the latitude lines are non-parallel curves.

U.S. Pat. No. 400,642, issued to Beaumont on Apr. 2, 1889, describes a map of the earth on two intersecting spheres, on which the coordinate lines of latitude and longitude are all arcs of circles.

U.S. Pat. No. 751,226, issued to Grinten on Feb. 2, 1904, represents the whole world upon the plane surface of a single circle with twice the diameter of the corresponding globe, the circle being delineated by a graticule of coordinates of latitude and longitude which are also arcs of circles.

U.S. Pat. No. 3,248,806, issued to Schrader on May 3, 1966, discloses a subdivision of the earth into a system of pivotally mounted flat maps, each map segment representing only a portion of the earth's surface in spherical projection on an equilateral spherical triangle to minimize distortion.

U.S. Pat. No. 2,094,543, issued to Lackey et al on Sept. 28, 1937, describes a projector for optically producing a variety of different map projections, including orthographic, stereographic and globular projections onto a flat translucent screens, and a variety of other projections on shaped screens.

U.S. Pat. No. 2,650,517, issued to Falk on Sept. 1, 1953, describes a photographic method for making geographical maps.

U.S. Pat. No. 2,354,785, issued to Rohl on Aug. 1, 1944, discloses two circular maps which are mounted side by side, and an arrangement for rotating the two maps in unison so that corresponding portions of the earth's surface are at all times in proper relationship.

U.S. Pat. No. 3,724,079, issued to Jasperson et al on Apr. 3, 1973, discloses a navigational chart display device which is adapted to display a portion of a map and enable a pilot to fix his position, to plot courses and to measure distances.

U.S. Pat. No. 2,431,847, issued to Van Dusen on Dec. 2, 1947, discloses a projection arrangement, in which a portion of the surface of a spherical or curved map may be projected in exact scale and in exact proportional relationship.

McBryde and Thomas, *Equal Area Projections for World Statistical Maps*, Special Publication No. 245, Coast & Geodetic Survey 1949.

In addition to the above, further teachings as to geographical mapping can be found in the *Elements of Cartography*, 4th edition, which was written by Arthur Robinson, Randall Sale and Joel Morrison, and published by John Wiley & Sons (1978).

The present invention seeks to provide a low cost and efficient mapping system which allows the quick and easy manipulation of and access to an extraordinary amount of mapping information i.e., a mapping system which allows a user to quickly and easily access a detailed map of any geographical area of the world.

Map information can be stored using at least three different approaches. i.e., paper, analog storage and digital storage, each approach having its own advantages and disadvantages as detailed below.

The paper mapping approach has been around since papyrus and will probably exist for the next thousand years.

Advantages of paper storage inexpensive.

once printed, no further processing is required to access the map information, so not subject to processing breakdown.

Disadvantages of paper storage can become bulky and unwieldy when dealing with a large geographical area, or a large amount of maps.

paper does not have the processing capabilities or "intelligence" of computers, and therefore does not support automated search or data processing capabilities.

cannot be updated cheaply and easily.

The analog mapping approach is used to provide what is commonly known as videodisc maps. The information is stored as still frames under N.T.S.C. (National Television Standards Committee) conventions. To make maps, a television camera moves across a paper map lying on a workbench. Every few inches a frame is recorded on videotape. After one row of the map is completely recorded, the camera is moved down to the next row of frames to be recorded. This process is repeated until frames representing a checkerboard pattern of the entire map are recorded. The recorded videotape could be used to view the map; however, access time to scan to different areas of the recorded map is usually excessive. As a result, a videodisc, with its quicker access time, is typically used as the medium for analog map storage. The recorded videotape is sent to a production house which "stamps" out 8 inch or 12 inch diameter videodisc.

Advantages of the analog storage approach one side of a 12 inch videodisc can hold 54,000 "frames" of a paper map. A frame is typically equal to $2\frac{1}{2} \times 3$ inches of the paper map.

access time to any frame can be fast, usually under 5 seconds.

once located on the videodisc, the recorded analog map information will be used to control the raster scan of a monitor and to produce a reproduction of the map in 1/30th of a second.

through additional hardware and software, mapping symbols test and/or patterns can be overlaid on top of the recorded frame.

Disadvantages of the analog storage approach the "frames" are photographed from paper maps, which as mentioned above, cannot be updated cheaply or easily.

due to paper map projections, mechanical camera movements, lens distortions and analog recording electronics, the videodisc image which is reproduced is not as accurate as the original paper map.

as a result of the immediately above phenomena, latitude and longitude information which is extracted from the reproduced image cannot be fully trusted.

if a major error is made in recording any one of the 54,000 frames, it usually requires redoing and re-stamping.

since frames cannot be scrolled, most implementations employ a 50% overlap technique. This allows the viewer to jump around the database with a degree of visual continuity; however, this is at a sacrifice of storage capacity. If the frame originally covered $2\frac{1}{2} \times 3$ inches or approximately 8 square inches of the paper map, the redundant overlap information is 6 square inches, leaving only 2 square inches of new information in the centroid of each frame.

as a result of the immediately above deficiency, a $2 \times 3$ foot map containing 864 square inches would require 432 frames; thus, only 125 paper maps could be stored on one side of a 12 inch videodisc.

must take hundreds of video screen dumps to make a hard copy of a map area of interest and, even then the screens do not immediately splice together because of the overlap areas.

the biggest disadvantage is that, since frames have to be arranged in a checkerboard fashion, there is no way to jump in directions other that north south, east or west and maintain visual continuity. As an example, the visual discontinuity in viewing a "great circle" route from Alaska to New York would be unbearable for all but the most hearty.

The digital mapping approach has been around for at least 20 years and is much more frequently used than the analog approach. Digital data bases are stored in computers in a format similar to test of other databases. Unlike map information on a videodisc, the outstanding map features are stored as a list of objects to be drawn, each object being defined by a plurality of vector "dot" coordinates which define the crude outline of the object. As one example, a road is drawn by connecting a series of dots which were chosen to define the path (i.e., the "outline") of the road. Once drawn, further data and processing can be used to smooth the crude outline of the object place text, such as the name or description of the object in a manner similar to what happens when drawing on a paper map.

Advantages of the digital approach digital maps are the purest form of geographical mapping data from them, paper and analog maps can be produced.

digital maps can be quickly and easily updated in near real-time, and this updating can be in response to data input from external sources (e.g., geographical monitoring devices such as satellite photography), digital maps can be easilky modified to effect desirable mapping treatments such as uncluttering, enhancing, coloring, etc.

digital maps can be easily and accurately scaled, rotated and drawn at any prospective view point.

digital maps can be caused to reproduce maps in 3-D.

digital maps can drive pen-plotters (for easy paper reproductions), robots, etc. p1 digital maps can be stored on any mass storage device.

Disadvantages of the digital approach digital maps require the use or creation of a digital database; this is a very time-consuming and expensive process, but once it is made the data base can be very easily copied and used for many different projects.

The digital approach is utilized with the present invention, as this approach provides overwhelming advantages over the above-described paper and analog approaches.

In designing any mapping system, several features are highly desirable:

First, it is highly desirable that the mapping system be of low cost.

Second, and probably most important, is access time. Not only is it generally desirable that the desired map section be accessible and displayed within a reasonable amount of time, but in some instances, this access time is critical.

In addition to the above, the present invention (as mentioned above), seeks to provide a third important feature,—a mapping system which allows the manipulation of and access to an extraordinary amount of mapping information, i.e., a mapping system which allows a user to quickly and easily access a detailed map of any geographical area of the world.

A tremendous barrier is encountered in any attempt to provide this third feature. In utilizing the digital approach to map a large geographical area in detail (e.g., the earth), one should be able to appreciate that the storage of mapping data sufficient to accurately define all the geographical features would represent a tremendous data base.

While there have been digital mapping implementations which have successfully been able to manipulate a tremendous data base, these implementations involve tremendous cost (i.e., for the operation and maintenance of massive mainframe computer and data storage facilities). Furthermore, there is much room for improvement in terms of access time as these mainframe implementations result in access times which are only as quick as 20 seconds. Thus there still exists a need for a low-cost digital mapping system which can allow the storage, manipulation and quick (i.e., "real time") access and visual display of a desired map section from a tremendous mapping data base.

There are several additional mapping system features which are attractive.

It is highly desirable that a mapping system be sensitive to and compensate for distortions caused by mapping curved geographical (i.e., earth) surfaces onto a flat, two-dimensional representation. While prior art approaches ave provided numerous methods with varying degrees of success, there is a need for further improvements which are particularly applicable to the digital mapping system of the present invention.

It is additionally attractive for a mapping system to easily allow a user to change his/her "relative viewing position", and that in changing this relative position the change in the map display should reflect a felling of continuity. Note that the "relative viewing position" should be able to be changed in a number of different ways. First, the mapping system should allow a user to selectively cause the map display to scroll or "fly" along the geographical map, to view a different (i.e., "lateral") position of the geographical map while maintaining the same degree of resolution as the starting position Second, the mapping system should allow a user to selectively vary the size of the geographical area being displayed (i.e., "zoom") while still maintaining an appropriate degree of resolution, i.e., allow a user to selectively zoom to a higher "relative viewing position" to view a larger geographical area with lower resolution regarding geographical, political and cultural characteristics, or zoom to a lower "relative viewing position" to view a smaller geographical area with higher resolution. (Note that maintaining the appropriate amount of resolution is important to avoid map displays which are effectively barren or are cluttered with geographical, political and cultural features.) Again, while prior art approaches have provided numerous methods with varying degrees of success, there is a need for further improvements which are particularly applicable to the digital mapping system of the present invention.

The final feature concerns compatibility with existing mapping formats. As mentioned above the creation of a digital database is a very tedious, time-consuming and expensive process. Tremendous bodies of mapping data are available from many important mapping authorities for example the United States Geological Survey (USGS). Defense Mapping Agency (DMA), National Aeronautics and Space Administration (NASA), etc. In terms of both being able to easily utilize the mapping data produced by these agencies and represent an attractive mapping system to these mapping agencies, it would be highly desirable for a mapping system to be compatible with all of the mapping formats used by these respective agencies. Prior art mapping systems have been deficient in this regard; hence, there still exists a need for such a mapping system.

SUMMARY OF THE INVENTION

The present invention provides a digital mapping method and system of a unique implementation to satisfy the aforementioned needs.

The present invention provides a computer implemented method and system for manipulating and accessing digital mapping data in a tremendous data base, and for the reproduction and display of electronic display maps which are representative of the geographical, political and cultural features of a selected geographical area. The system includes a digital computer, a mass storage device (optical or magnetic), a graphics monitor, a graphics controller, a pointing device, such as a mouse, and a unique approach for structuring, managing, controlling and displaying the digital map data.

The global map generating system organizes the mapping data into a hierarchy of successive magnitudes or levels for presentation of the mapping data with variable resolution, starting from a first or highest magnitude with lowest resolution and progressing to a last or lowest magnitude with highest resolution. The idea of this hierarchical structure can be likened to a pyramid with fewer stones or "tiles" at the top, and where each successive descending horizontal level or magnitude contains four times as many "tiles" as the level or magnitude directly above it. The top or first level of the pyramid contains 4 tiles the second level contains 16 tiles, the third contains 64 tiles and so on, such that the base of a 16 magnitude or level pyramid would contain 4 to the 16th power or 4,294,967,296 tiles. This total includes "hyperspace" which is later clipped or ignored. Hyperspace is that excess imaginary space left over from mapping of 360 deg. space to a zero magnitude virtual or imaginary space of 512 deg. square.

A first object of the present invention is to provide a digital mapping method and system which are of low cost.

A second and more important object of the present invention is to provide a unique digital mapping method and system which allow access to a display of the geographical, political and cultural features of a selected geographical area within a minimum amount of time.

A third object of the present, invention is to provide a digital mapping method and system which allow the manipulation of and access to an extraordinary amount of mapping information, i.e., a mapping method and system which allow a user to quickly and easily access a detailed map of any geographical area of the world.

Another object of the present invention is to provide a digital mapping method and system which recognize and compensate for distortion introduced by the representation of curved (i.e., earth) surfaces onto a flat two-dimensional display.

Still a further object of the present invention is to provide a digital mapping method and system which allow a user to selectively change his/her "relative viewing position", i.e., to cause the display monitor to scroll or "fly" to display a different "lateral" mapping position of the same resolution, and to cause the display monitor to "zoom" to a higher or lower position to display greater or smaller geographical area, with an appropriate degree of resolution.

A fifth object of the present invention is to provide a digital mapping method and system utilizing a unique mapping graticule system which allows mapping data to be compatibly adopted from several widely utilized mapping graticule systems.

BRIEF DESCRIPTION OF THE DRAWINGS

The foregoing and other objects, structures and features of the present invention will become more apparent the following detailed description of the preferred mode for carrying out the invention; in the description to follow, reference will be made to the accompanying drawings in which.

DETAILED DESCRIPTION OF THE PREFERRED EMBODIMENTS OF THE INVENTION

Before turning to the detailed description of the preferred embodiments of the invention, it should be noted that the map illustrations used throughout the drawings are only crude approximations which are only being used to illustrate important features and aspects and the operation of the present invention; therefore, the geographical political and cultural outlines may very well differ from actual outlines.

Figure 1:
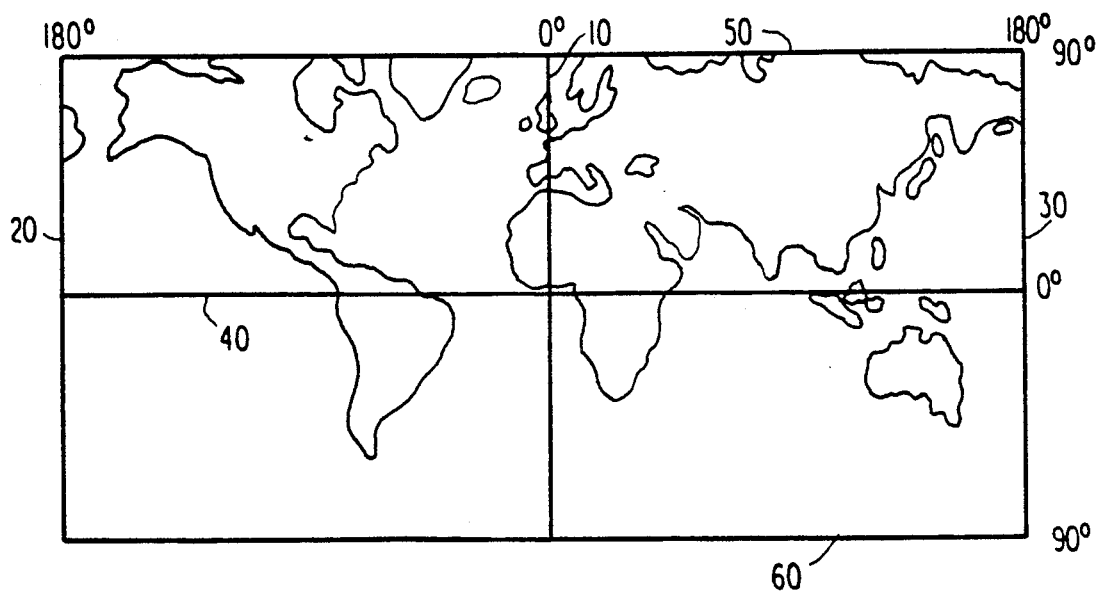
FIG. 1 is an illustration corresponding to a flat projection of the earth's surface.

FIG. 1 is a crude representation of what the earth's surface would look like if it were laid flat and viewed from a "relative viewing position" which is a great distance in space. Shown as vertical lines are: 10, corresponding to the 0° meridian extending through Greenwich, England: 20, corresponding to the 180° west meridian: and, 30, corresponding to the 180° east meridian. Shown as horizontal lines are: 40, corresponding to the equator: 50, corresponding to 90° north (i.e., the north pole): and 60, corresponding to 90° south (i.e., the south pole).

Note that at this "relative viewing position", not much detail as to cultural features is seen; i.e., all that is seen is the general outline of the main geographical masses of the continents.

The present invention seeks to provide a low cost and efficient computer-based mapping method and system having a unique approach for arranging and accessing a digital mapping database of unlimited size, i.e., a mapping method and system which can manipulate and access a data base having sufficient data to allow the mapping system to reproduce digital maps of any geographical area with different degrees of resolution. This can be most easily understood by viewing FIG. 2 and FIGS. 3A-F.

Figure 2:
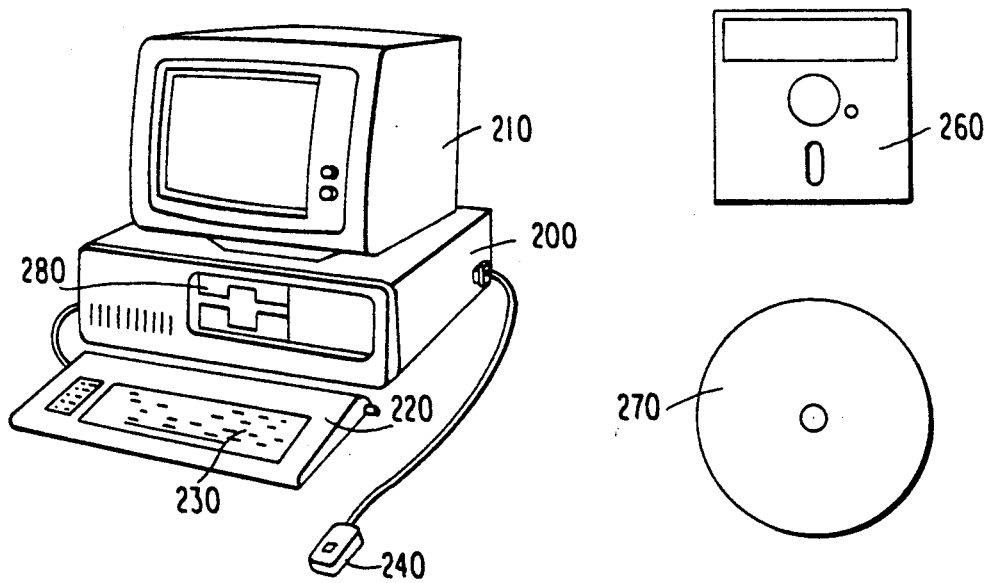
FIG. 2 is an illustration of a digital computer and mass storage devices which can be utilized in implementing the present invention.

Because of the overwhelming advantages over the paper and analog mapping approaches, the digital mapping approach is utilized with the present invention; thus, there is shown in FIG. 2, a digital computer 200, having a disk or hard drive 280, a monitor 210, a keyboard 220 (having a cursor control portion 230), and a mouse device 240. As mentioned previously, in a digital mapping approach, mapping information is stored in a format similar to the text of other databases, i.e., the outstanding map features are stored as a list of objects to be drawn, each object being defined by a plurality of vector "dot" coordinates which define the crude outline of the object. (Note: the reproduction of a digital map from a list of objects and "dot" vectors is well known the art, and is not the subject matter of the present invention; instead the invention relates to a unique method and system for storing and accessing the list objects and "dot" vectors contained in a tremendous digital data base.)

Once a geographical map has been "digitized"—i.e., converted to a list of objects to be drawn and a plurality of vector "dot" coordinates which define the crude outline of the object—the mapping database must be stored in the memory of a mass storage device. Thus, the digital computer 200, which is to be used with the mapping method and system of the present invention, is shown associated with the magnetic disk 260 (which represents any well-known magnetic mass storage medium, e.g., floppy disks, hard disks magnetic tape, etc.), and the CD-ROM 270 (which represents any well-known optical storage medium, e.g. a laser-read compact disk). Alternatively, the digital mapping database can be stored on, and the digital computer can be associated with, any well known electronic mass storage memory medium (e.g. ROM, RAM, etc.). Because of every increasing availability reductions in cost, and tremendous storage capacities, the preferred memory mass storage medium is the CD-ROM i.e., a laser-read compact disk.

The discussion now turns to FIGS. 3A-F showing illustrations of monitor displays which provide a brief illustration of the operation of the present invention. Although the digital nature of the maps of FIGS. 3A-3F can easily be detected due to the jagged outlines, it should be understood that these geographical outlines could easily be smoothed using any of a number of "smoothing techniques" which are well-known to those skilled in the digital mapping art.

Figure 3A:
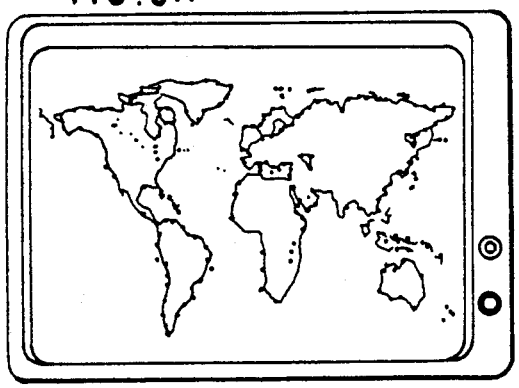
FIGS. 3A-3F are illustrations of a monitor displays showing the ability of the present invention to display varying sizes of geographical areas at varying degrees of resolution.
Figure 3B:
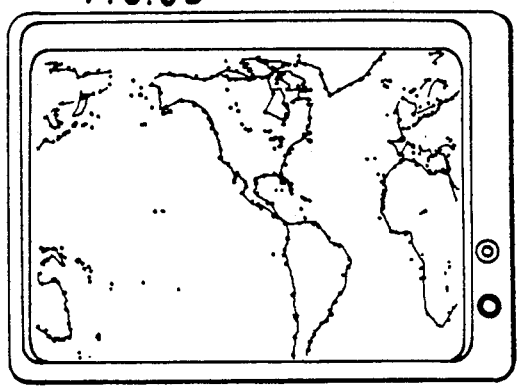

In FIG. 3A, the digital computer has retrieved relevant mapping information from the digital mapping database, and has produced a monitor display of a digital map substantially corresponding to the flat projection of the earth's surface which was shown in FIG. 1. In FIG. 3A, the monitor display reflects a "relative viewing position" which is a great distance in space, and hence only the crude geographical outline of the continents is shown with sparse detail.

Suppose a user wishes to view a map of the states of Virginia and Maryland in greater detail. By entering the appropriate commands using the keyboard 220 or the mouse device 240, a user can cause the monitor display to "zoom" to a lower "relative viewing position", such that the monitor displays a digital map of a smaller geographical area which is shown at a higher degree of resolution. Thus, in FIG. 3B the a digital map of the continents of the western hemisphere is displayed in greater detail.

Figure 3C:
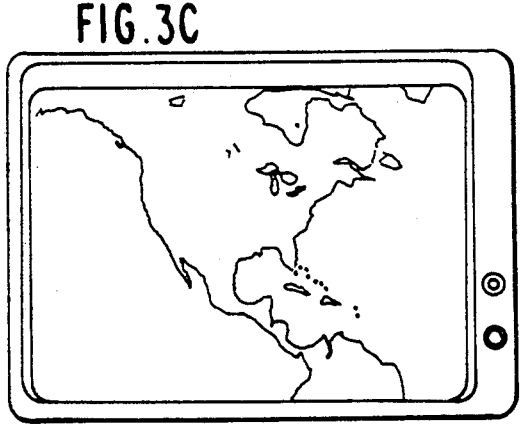
Figure 3D:
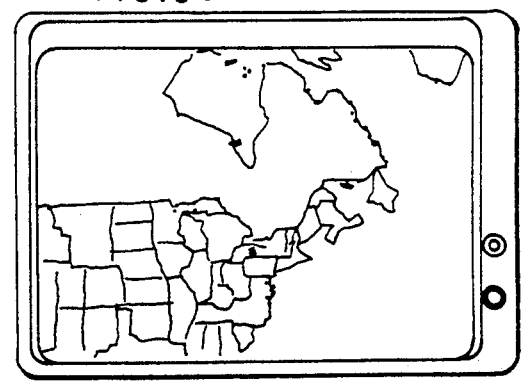
Figure 3E:
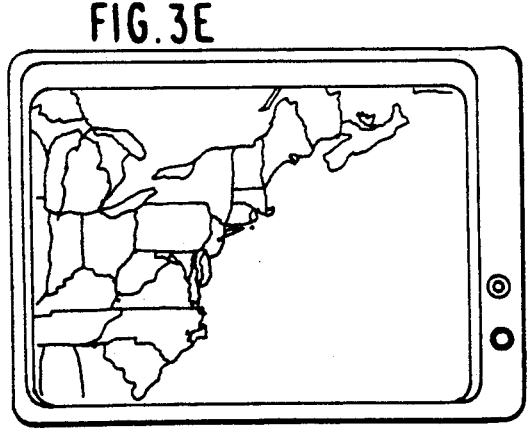
Figure 3F:
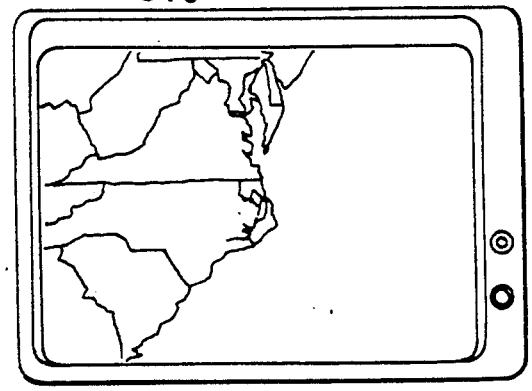

By entering additional commands, a user can cause the monitor display to further "zoom" to the following displays: FIG. 3C showing North America in greater detail; FIG. 3D showing the eastern half of the United States in greater detail; FIG. 3E showing the east coast of the United States in greater detail; and, FIG. 3F showing Virginia and Maryland in greater detail.

Although in this example, the monitor display was caused to "zoom" to Virginia and Maryland, it should be appreciated that the present invention allowed a user to selectively zoom into any geographical area of the earth, and once a user has reached the desired degree of mapping resolution, the mapping system of the present invention also allows the user to "scroll" or "fly" to a different lateral position on the map.

Furthermore, although the drawings illustrate the monitor display zooming to display state boundaries and features, it should be further appreciated that the present invention is by no means limited to this degree of resolution. In fact, the degree of resolution capable with the present invention will be shown to be limited only by the operating system of the digital computer 200 with which the present invention is used. In one demonstration the monitor display has been shown to be able to zoom to resolution where the outlines of streets were displayed. Even further degrees of resolution are possible as will be more fully understood after the discussions below.

In digitally mapping a large geographical area (e.g., the earth) in detail—especially in the degree of resolution mentioned above—one should be able to appreciate that the storage of digital mapping data sufficient to accurately define all the geographical political and cultural features would represent a tremendous digital mapping database. In order to provide a low cost mapping system having quick access time and allowing a high degree of resolution, what is needed is a mapping system having an effective approach for arranging an accessing the digital database. Prior art mapping systems have been deficient in this regard.

The mapping system of the present invention utilizes a new and extremely effective approach, which can be most easily understood using the following simplified example.

Figure 4:
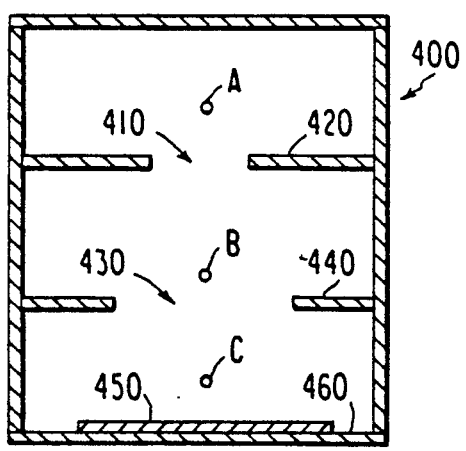
FIG. 4 is a cross-sectional diagram of a simple building example explaining the operation of the present invention.

In FIG. 4, there is shown the cross-section of a building 400, with a square hole 410 (shown in cross-section) cut through the third level floor 420 with a larger square hole 430 (shown in cross-section) cut in the second level floor 440, and with a large square piece of paper 450 (shown in cross-section) laid out on the first level floor 460. Suppose it was desired to build up a digital data base which could be used to reproduce a digital map of the paper 450 with varying degrees of resolution.

Figure 5A:
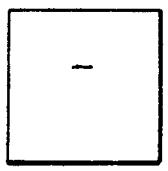
FIG. 5A and b are plan view representations of the paper 450 as it is viewed from the relative viewing position A shown in FIG. 4.

First, one would take the "relative viewing position" A, and view the paper 450 through the square hole 410 in the third level floor 420. At this level, the paper 450 appears small (FIG. 5A), and the degree of resolution is such that the message appears only as a series of dots. In order to build up a digital mapping database, the visual perception (FIG. 5A) is imagined to be divided into four equal quadrants a, b, c, d (FIG. 5B), and visual features appearing in each respective area is digitized and stored in a separate database file. Thus, four separate database files can be utilized to reproduce a digital map of the paper 450 as viewed from position A (FIG. 4).

In order to digitize and record data corresponding to a second (or higher) degree of resolution, the next "relative viewing position" B (FIG. 4) is taken to view the paper 450 through the square hole 430. At this level, the paper 450 appears larger (FIG. 6), and the degree of resolution is such that the message now appears as a series of lines. At this second level, the map is imagined as being divided into four times as many areas as the first imaginary division, and then, the visual information contained within each area is digitized and stored in a separate database file. Thus, 16 files can be used to reproduce a digital map of the paper 450, as viewed from the relative viewing position B (FIG. 4)

In order to digitize and record data corresponding to a third (or higher) degree of resolution, the next "relative viewing position" C (FIG. 4) is taken to view the paper 450. At this level, paper 450 now appears larger (FIG. 7) and has visual features of higher resolution. The paper 450 is imagined as being divided into four times as many areas as the second imaginary division, and the visual information is digitized and stored. Thus, 64 files could be used to reproduce a digital map of the paper 450, as viewed from the relative viewing position C (FIG. 4).

Figure 5B:
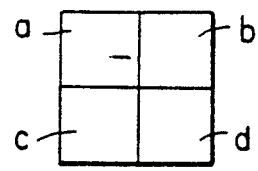
Figure 6:
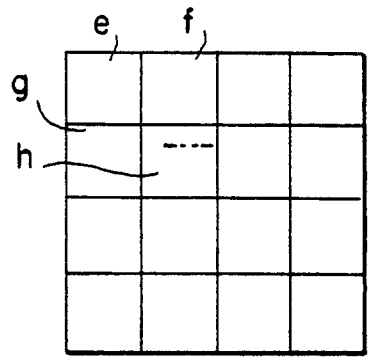
FIG. 6 is a plan view representation of the paper 450 as it is viewed from the relative viewing position B shown in FIG. 4.
Figure 7:
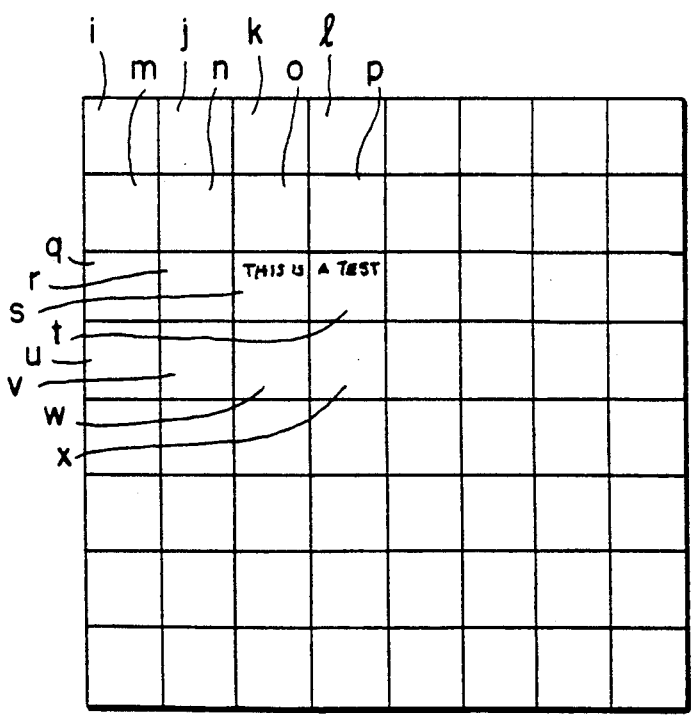
FIG. 7 is a plan view representation of the paper 450 as it is viewed from the relative viewing position C shown in FIG. 7.
Figure 8:
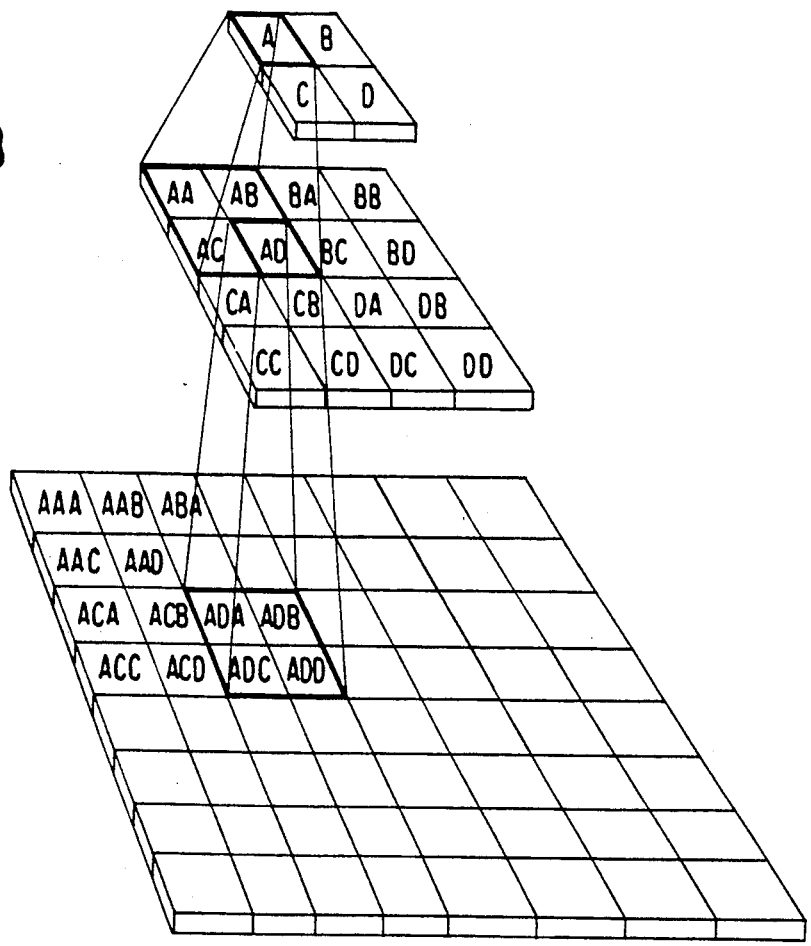
FIG. 8 is a pyramidal hierarchy of the data base files, showing an example of the ancestry which exits between files.

Once digital data has been entered for the above three "relative viewing positions" A, B, C (FIG. 4), the digital mapping database contains 4+16+64 or 84 files which can be conceptually envisioned as being arranged in a pyramids structure as shown in FIG. 8. In order to allow a user to selectively display any desired map section at the desired degree of resolution, the digital computer 200 must be able to know which of the 84 files to access such that the appropriate mapping data can be obtained. The present invention accomplishes this by conceptually arranging the files in a pyramidal structure, and assigning a file name to each file which is related both to the file's position and ancestry within the pyramidal structure. This can be more specifically described as follows:

A file's ancestry can be explained using the illustrations of FIGS. 5B, 6 and 7. In FIG. 5B, the paper 450, as viewed from "relative viewing position" A (FIG. 4), is subjected to an imaginary division into four quadrants a, b, c, and d. Quadrants a, b, c, d are related to one another in the sense that it takes all four areas to represent the paper 450; hence quadrants a, b, c, d can be termed as brothers and sisters.

FIG. 6 is an illustration of the paper 450 as it appears from the relative viewing position B (FIG. 4), with the paper 450 being subjected to an imaginary division into 16 areas. Note that the areas e, f, g, h (FIG. 6) represent the same area of paper 450 as the quadrant a (FIG. 5B). In effect, quadrant a has been enlarged (to show a higher degree of resolution) and divided into quadrants e, f, g, h. Thus it can be said that quadrant a (FIG. 5B) is the parent, and that quadrants e, f g, h (FIG. 6) are brothers and sisters and the offspring of ancestor a. Similar discussions can be made for quadrants b, c and d and the remaining area of FIG. 6.

FIG. 7 is an illustration of the paper 450 as it appears from the relative viewing position C (FIG. 4), with the paper 450 being subjected to an imaginary division into 64 areas. In a manner similar to the discussion above, note that areas s, t, w, x (FIG. 7) represent the same area of paper 450 as the quadrant h (FIG. 6). In effect, quadrant h has been enlarged (to show a higher degree of resolution) and divided into quadrants s, t, w, x. Thus, it can be said that quadrant a (FIG. 5B) is the grandparent, quadrant h (FIG. 6) is the parent, and quadrants s, t, w, x (FIG. 7) are the brothers and sisters and offspring of ancestors a and h.

As described previously, once FIGS. 5B, 6 and 7 are subjected to the imaginary divisions the visual information in each area (or quadrant) is digitized and stored in a separate file. The 84 resulting files can be conceptually envisioned as the pyramidal structure shown in FIG. 8. In FIG. 8 dashed lines are utilized to show the lineage of the files just discussed.

FIG. 8 is further exemplary of the one file naming operation which can be utilized with the present invention.

At the top of the pyramidal structure (FIG. 8), each of the four quadrant files is arbitrarily assigned a different character. A, B, C, D. (Note The characters assigned are not critical with regard to the invention, and hence, it should be noted that any characters can be assigned e.g., 0, 1, 2, 3, etc.)

In moving down one level in the pyramidal structure, the filenames for each of the respective files on the second level is increased to two characters.

In calculating the filenames, it is convenient to first divide the second level files into groups of four, according to parentage. To maintain a record of ancestry, the ancestor filename of each file is maintained as the first part of the filename. In determining the second part, the naming protocol which was utilized to name the quadrant files of the top level, is also utilized in naming the respective quadrant files on the second level. Thus, parent file A is shown as being related to descendent (i.e., brother and sister) files AA, AB, AC, AD. Similar discussion can be made for the remaining files along these two level.

A similar process can be utilized in providing the unique filenames to the third level files. At this level, the filenames consist of three characters. Again, the ancestor filename of each file would be maintained as a first filename part, in order to maintain a record of ancestry. In the example illustrated (FIG. 8). parent file AD is shown as being related to descendent (i.e., brother and sister) files ADA, ADB, ADC, ADD. Similar discussions can be made for the remaining files along these two levels, and furthermore, similar discussions can be made each time a pyramidal level is added.

From the above discussion, one should be able to realize that the above-described naming convention is particularly useful in programming a digital computer to move through the pyramidal file structure to access the appropriate data corresponding to varying degrees of resolution. More particularly, one should be able to realize that, since file names increase one character in length each time there is a downward movement through the pyramidal structure and the protocol for naming descendent files is known, the digital computer can be programmed to quickly and easily access the appropriate files for a smaller mapping area with a greater degree of resolution. Similarly one should be able to realize that since the filenames decrease one character in length each time there is an upward movement through the pyramidal structure, the digital computer can be programmed to quickly and easily access the appropriate files for a greater mapping area with a smaller degree of resolution.

The following example is believed to provide an increase in the understanding of the present invention.

Figure 9A:
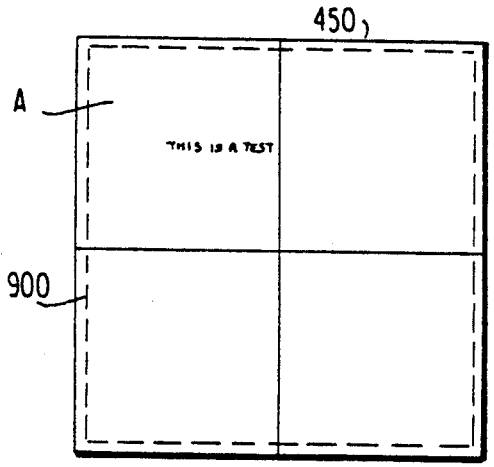
FIG. 9A is a plan view representation of the paper 450, with the paper being divided into a first level of quadrant areas.
Figure 9B:
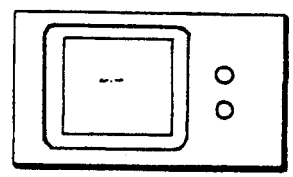
FIG. 9B is an illustration of a monitor displaying a digital map of the area enclosed by the dashed portions in FIG. 9A.

In the example, it is assumed that the digital database corresponding to the three resolutions of the paper 450 (as shown in FIGS. 4, 5A-B, 6, 7) have been loaded to be accessible from the memory mass storage device, and furthermore, it is assumed that the mapping system is programmed to initially access and display a digital map corresponding to the digital mapping data in the files A, B, C, D (FIG. 8). Thus the monitor (FIG. 9B) would display (in low resolution), the entire area enclosed within dashed portion 900 illustrated on the paper 450 (FIG. 9A). (Note: The reproduction of a digital map from digital data from several different files or sources is well-known in the art and is not the subject matter of the present invention.)

Figure 10B:
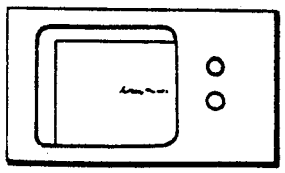
FIG. 10B is an illustration of a monitor displaying a digital map of the area enclosed by the upper-left dashed portion in FIG. 10A.

Suppose the user notices the dotted area on the low resolution map and wishes to investigate this area further. By using the appropriate keys (e.g., , /, /, ) and/or a mouse device a user can give the mapping system an indication that he/she wishes to see the smaller area (i.e., quadrant A) at a higher degree of resolution. Upon receiving this preference, the mapping system can use its knowledge of the file naming operations to quickly determine the names of the files which must be accessed. More specifically, using A as the parent file name and following the existing quadrant naming protocol the mapping system is quickly and easily able to calculate that it is files A, AB, AC, AD which it needs to access. Once these files are accessed, the monitor in FIG. 10B displays (in higher resolution) the area enclosed within the dashed portion 1000 as illustrated on the paper 450 (FIG. 10A).

If a user is still not satisfied with the degree of mapping resolution, the user can again use the appropriate keys or mouse device to indicate that he/she wishes to see the smaller area (e.g., quadrant D; FIG. 10A) in a higher degree of resolution. In using AD as the parent filename and following the existing quadrant naming protocol, the mapping system is quickly and easily able to calculate that it is files ADA, ADB, ADC, ADD which it needs to access. Once these files are accessed, the monitor (FIG. 11B) displays (in higher resolution), the area enclosed within the dashed portion 1100 as illustrated on the paper 450 (FIG. 11A).

One skilled in the digital mapping and computer programming art should recognize that "scrolling" or "flying" to different lateral "relative viewing positions" to display a different lateral portion of the map is also provided by the present invention. Instead of adding or removing filename characters as in a change of resolution, in the instances, the mapping system must be programmed to keep track of the filenames of the current position and also, the orderly arrangement of filenames so that the appropriate filenames corresponding to the desired lateral position can be determined. As an example if the user desired to scroll to the right border of the paper 450, the mapping system would respond by accessing and causing the monitor to display the digital maps corresponding to the following sequence of files: (Note: In this example, it is assumed that it takes 4 files to provide sufficient digital data to display a full digital map on a monitor) ADA, ADB, ADC, ADD; ADB, ADD, BCA, BCC; BCA, BCB, BCC. BCD; BCB, BCD BDA. BDC; and BDA, BDB, BDC, BDD. If the user, then desired to scroll to the bottom (right corner) of the paper 450, the mapping system would respond by accessing and causing the monitor to display the digital maps corresponding to the following files: BDA, BDB, BDC, BDD; BDC, BDD, DBA, DBB; DBA, DBB. DBC. DDB. DDC. DDD. In effect as all of the files in the above example correspond to the same level of resolution, all these files (and any group of files which exist on the same level of resolution) can be taken as being related as cousins.

Figure 10A:
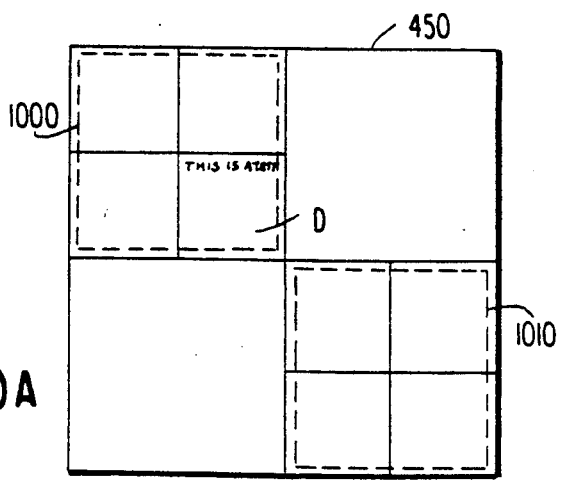
FIG. 10A is a plan view representation of the paper 450, with the upper-left and lower-right paper quadrant areas being further divided into quadrants.
Figure 11A:
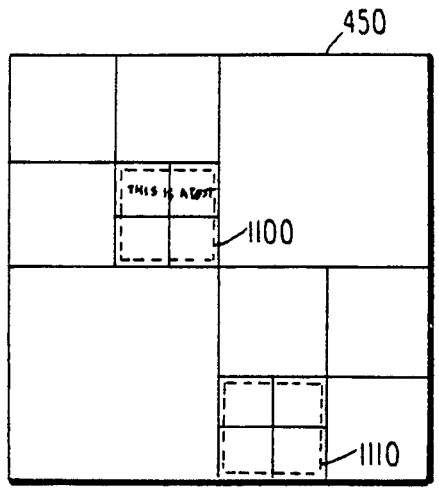
FIG. 11A is a plan view representation of the paper 450, with several sections of the second level of quadrants being further divided into additional quadrants.
Figure 11B:
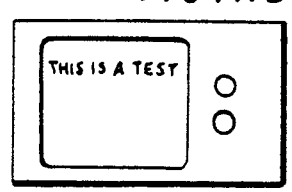
FIG. 11B is an illustration of a monitor displaying a digital map of the area enclosed by the upper-left dashed portion in FIG. 11A.

FIGS. 9A, 10A, 11A can also be used to illustrate the operation of moving toward the display of a larger mapping area with a lower degree of resolution.

Assume that after lateral "scrolling" or "flying" that the monitor is now displaying (not shown) a digital map corresponding to the enclosed area 1110 shown in FIG. 11A. (Note: at this position the mapping system is accessing and display a digital map corresponding to the digital data in the files DCA DCB, DCC, DCD). Suppose the user now wishes to cause the "relative viewing position" to zoom upward such that the monitor will display a larger portion of the paper 450 at a lower degree of resolution. By using the appropriate keys or a mouse device, the user indicates his/her preference to the mapping system. Upon receiving this preference, the mapping system is programmed to quickly determine the names of the files which must be accessed. More specifically, the mapping system is able to look at the first portion of the filenames currently being used (i.e., DCA, DCB, DCC, DCD), to immediately determine that these files have the ancestry DC, i.e., have a grandfather D and a parent DC. The mapping system then immediately determines brother and sister files of parent file DC as being DA, DB and DD. The mapping system then accesses these files and causes the monitor to display a digital map (not shown) corresponding to the enclosed portion 1010 (FIG. 10A) of the paper 450.

Suppose the user again indicate a preference to cause the "relative viewing position" zoom upward. Upon receiving this preference, the mapping system again goes through a process similar to that discussed immediately above. However, this time the mapping system looks at the filenames currently being used (i.e., DA, DB, DC, DD) and determines that parent file D has brother and sister files A, B and C. The mapping system then immediately accesses these files and causes the monitor to display a digital map (FIG. 9B) corresponding to the enclosed portion 900 (FIG. 9A) of the paper 450.

The text now turns to a description of the operation for assigning unique filenames in the currently preferred embodiment, i.e., in a digital mapping system which is implemented in a DOS operating system.

As anyone skilled in the computer art will know, every computer operating system has its own unique set of rules which must be followed. In an implementation of the present invention in a DOS operating system, the DOS rules must be followed. Since a critical feature of the present invention is the division of the digital mapping database into a plurality of files (each having a unique filename), of particular concern with the present invention, is the DOS rules regarding the naming of filenames.

A DOS filename may be up to eight (8) characters long and furthermore, may contain three (3) additional trailing characters which can represent a file specification. Thus, a valid DOS filename can be represented by the following form:

_ _ _ _ _ _ _ _ . _ _ _ where "_" can be replaced by any ASCII (including blanks), except for the following ASCII characters:

. " / \ [ ] : | > ≦ + ; , and ASCII characters below 20H. The currently preferred embodiment stays within these DOS filename rules by using the file naming operations which are detailed below.

Because the assigned filenames will be seen to be related to hexadecimals, a useful chart containing the hexadecimal base and also a conversion list (which will be shown to be convenient ahead), is reproduced below:

| Column 1 | Column 2 | Column 3 |
|----------|----------|----------|
| 0000 | 0 | G |
| 0001 | 1 | H |
| 0010 | 2 | I |

-continued

| Column 1 | Column 2 | Column 3 |
|---|---|---|
| 0011 | 3 | J |
| 0100 | 4 | K |
| 0101 | 5 | L |
| 0110 | 6 | M |
| 0111 | 7 | N |
| 1000 | 8 | O |
| 1001 | 9 | P |
| 1010 | A | Q |
| 1011 | B | R |
| 1100 | C | S |
| 1101 | D | T |
| 1110 | E | U |
| 1111 | F | V |

The first column contains a list of all the possible 4-bit binary combinations; the second column contains the hexadecimal equivalent of these binary numbers; and the third column concerns a "mutant-hex" conversions which will be shown to be important in the discussion to follow.

In the operations to assign unique filenames for use in a DOS operating system, the present invention looks at each of the eight DOS filename characters as hexadecimal characters rather than ASCII characters. Hence, while the following discussion will center around determining unique filenames using hexadecimal (and "mutant-hexadecimal") characters, it should be understood that in an actual DOS implementation, the hexadecimal filenames must be further converted into the equivalent ASCII characters such that the appropriate DOS file naming rules are followed.

At this point, it is also useful to note that the file naming operation of the preferred embodiment is not concerned with the trailing three character filename extension. However, it should be further noted that this three character filename extension may prove useful in specifying data from different sources, and allowing the different types of data to reside in the same database. As examples, the filename extension ".spm" might specify data from scanned paper maps, the filename extension ".si" might specify data from satellite imagery the filename extension ".ged" might specify gridded elevation data, etc.

As a result of the foregoing and following discussions, it will be seen that the naming operation of the preferred embodiment is concerned only with a filename of the following form:

_ _ _ _ . _ _ _ where each "_" represents a character which is a hexadecimal character within the character set of "0—9" and "A-F", or is a "mutant-hexadecimal" character within the character set of "G-V".

Several more important file naming details should be discussed.

First, it should be pointed out that the first four (4) filename characters is designated as corresponding to the "x" coordinate characters, and the last four (4) filename characters are designated as corresponding to the "y" coordinate characters.

Second, during the file naming operations, often it is necessary to convert the filename characters into the equivalent binary representation. As each hexadecimal character can be converted into a four bit binary number, it can be seen that the first four (4) filename characters (designated as "x" coordinate characters) can be converted into sixteen (16) binary bits designated as "x" bits, and similarly that the last four (4) filename characters (designated as "y" coordinate characters) can be converted into sixteen (16) binary bits designated as "y" bits. As will become more apparent ahead each of these sixteen (16) "x" and "y" bits corresponds to a filename bit which can be manipulated when assigning filenames at a corresponding magnitude or level of mapping resolution e.g. the first "x" and first "y" bits correspond to filename bits which can be manipulated when assigning unique filenames at the first magnitude, the second "x" and second "y" bits correspond to filename bits which can be manipulated when assigning unique filenames at the second magnitude etc.

Figure 12:
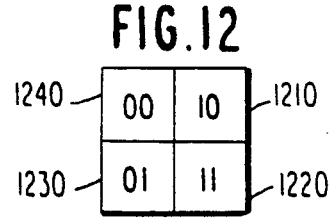
FIG. 12 is a plan view illustration of a quadrant area division, with a two-bit naming protocol being assigned to each of the quadrant areas.

Third, FIG. 12 corresponds to the naming protocols which are utilized to modify and relate a parent filename to four (4) quadrant filenames. Note that there is a two-bit naming protocol in each of the quadrant files. As will become more clear ahead the first bit of each protocol determines whether the current "x" filename bit will be modified (i.e., if the first protocol bit is a "1", the current "x" filename fit is changed to a "1", and if the first protocol bit is a "0" the current "x" filename bit is maintained as a "0"), and the second bit determines whether the current "y" filename bit will be modified (in a similar manner).

The text now turns to a file naming example which is believed to provide further teachings and clarity to the currently preferred file naming operation.

Figure 13:
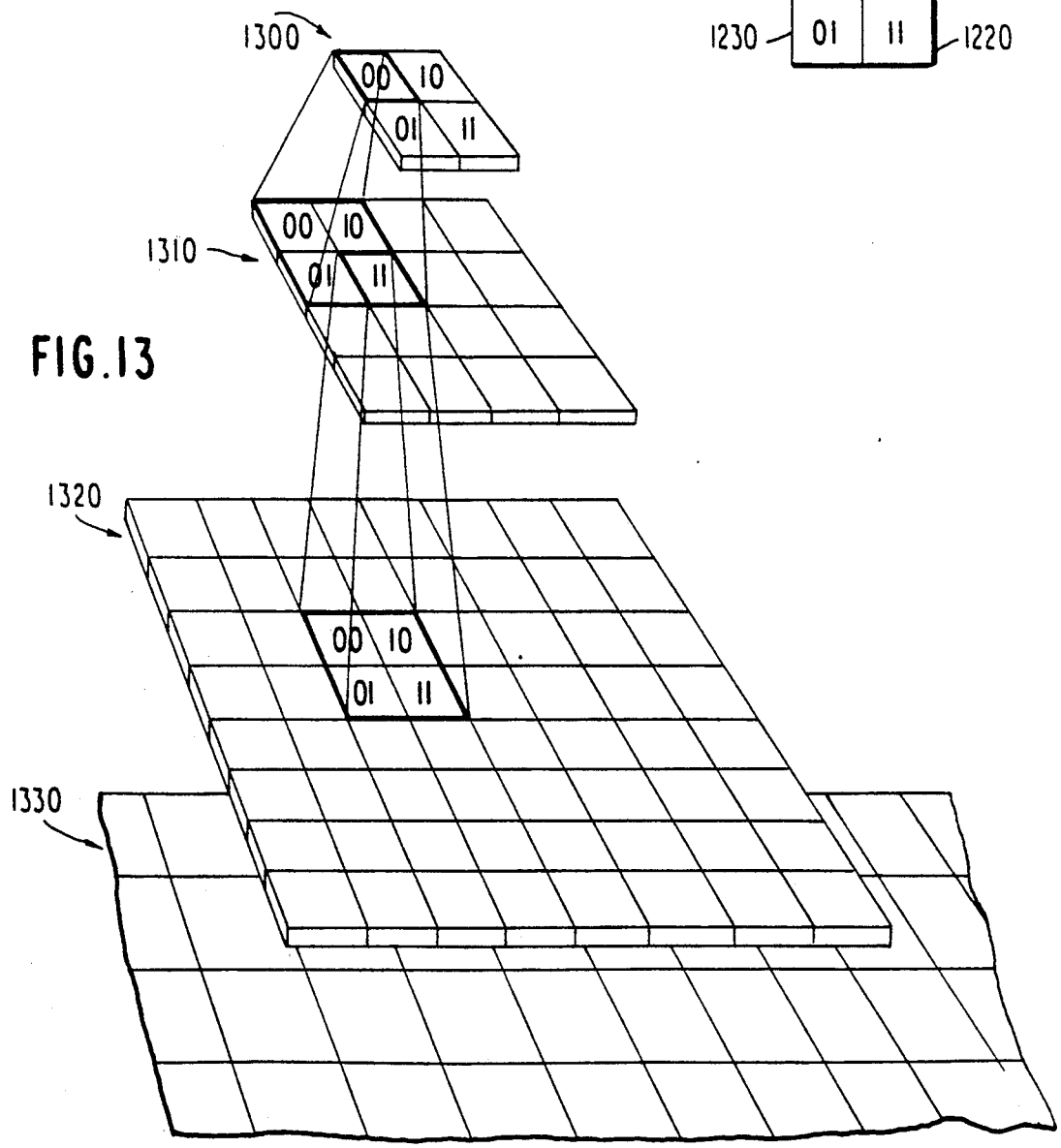
FIG. 13 is a pyramidal hierarchy of the data base files using the two-bit naming protocol of FIG. 12, and showing an example of the ancestry which exits between files.

FIG. 13 is an illustration of a portion of the preferred digital data base, with the plurality of files (partially shown) being arranged in a conceptual pyramidal manner in a manner similar to that which was described with reference to FIG. 8. More specifically, there is shown four files 1300 having digital data corresponding to a first level or magnitude of mapping resolution, sixteen files 1310 having digital data corresponding to a second level or magnitude of mapping resolution, sixty-four files 1320 having digital data corresponding to a third level or magnitude of mapping resolution, and a partial cut-away of a plurality of files 1330 having data corresponding to a fourth level or magnitude of mapping resolution. Although not shown, it is to be understood that, in the preferred embodiment, level or magnitudes five through sixteen similarly exist. As examples of the file naming operation, filenames will now be calculated for the files which essentially occupy the same positions as the files which were outlined in FIG. 8.

We begin with the initializing eight (8) character filename:

0 0 0 0 0 0 0 0 which can be converted to the binary equivalent:

0000 0000 0000 0000 0000 0000 0000 0000

The binary representation is the basic foundation which will be used to calculate all of the filenames for the files on the first level (1300). Note, that the first and last four filename characters, and the first and last sixteen bits are slightly separated in order to conveniently distinguish the "x" and "y" coordinate characters and bits. Both the first (leftmost) "x" bit and the first (leftmost) "y" bit are the bits which can be manipulated in assigning a unique filename to the files on the first level.

File naming begins with the first (upper-rightmost) file on the first level 1300. The naming protocol assigned to this quadrant file is the two-bit protocol "10".

As the first protocol bit is a "1", this means that the current "x" bit must be changed to a "1". As the second protocol bit is a "0", this means that the current "y" bit is maintained as a "0". As a result of the foregoing, the first (upper-rightmost) file is assigned the filename having the binary equivalent of:

1000 0000 0000 0000 0000 0000 0000 0000 which can be converted to the hex characters:

8 0 0 0 0 0 0 0.

In proceeding clockwise, next is the second (lower-rightmost) file on the first level 1300. The naming protocol assigned to this quadrant file is the two-bit protocol "11". As the first protocol bit is a "1", the current "x" bit is changed to a "1" similarly, as the second protocol bit is a "1", the current "y" bit is changed to a "1". As a result of the foregoing, the second (lower-rightmost) file is assigned the filename having the binary equivalent of:

1000 0000 0000 0000 1000 0000 0000 0000 which can be converted to the hex characters:

8 0 0 0 8 0 0 0.

Continuing clockwise, next is the third (lower-leftmost) file on the first level 1300. The naming protocol assigned to this quadrant file is the two-bit protocol "01". As the first protocol bit is a "0", the current "x" bit is maintained at 0. As the second protocol bit is a "1", the current "y" bit is changed to a "1". As a result of the foregoing, the third (lower-leftmost) file is assigned the filename having the binary equivalent of:

0000 0000 0000 0000 1000 0000 0000 0000
which can be converted to the hex characters:

0 0 0 0 8 0 0 0.

Finally, there is the fourth (upper-leftmost) file on the first level 1300. The naming protocol assigned to this quadrant is the two-bit protocol "00". As neither of the protocol bits is a "1", it can be easily seen that neither of the current "x" and "y" bits changes, and hence, the fourth (upper-leftmost) file is assigned the filename having the binary equivalent of:

0000 0000 0000 0000 0000 0000 0000 0000 which can be converted to the hex characters:

0 0 0 0 0 0 0 0.

While it might appear that the example is continuing to use the sixteen "0" initializing filename, such is not the case. In naming files from the second level or magnitude downward, the binary equivalent of the parent file's name is utilized as the foundation from which the descendent file's name is derived. It is only coincidental that the filename of the parent file 00000000 is the same as the initializing filename. Use of the parent's filename to calculate the descendent's filename will become more readily apparent ahead in the example.

In continuing the file naming example, the fourth (upper-leftmost) file (having filename 00000000) in the first level 1300 can be viewed as being the parent file of the four (highlighted) quadrant files in the second level 1310. As stated above, the binary equivalent of parent file's 00000000 name is utilized as the foundation for calculating the descendent file s filenames. At this second level or magnitude, the second "x" and "y" bits from the left in the parent's binary filename are taken as the "current" bits which can be manipulated to provide a unique filename for the descendent files.

As the calculation of the filename for the fourth (upper-leftmost) file of the second level 1310 illustrates a very important modification in the file naming operation the example will first continue with discussions corresponding to this file.

As the naming protocol assigned to the fourth (upper-leftmost) file of the second level 1310 is two-bit protocol "00" it can be seen that neither of the current "x" and "y" bit would be changed. Hence the parent's filename 00000000 is unchanged, and is attempted to be adopted as the descendent's filename. However, note that this is extremely undesirable as the operation of the present invention is based on assigning each data file a unique filename and furthermore a DOS operation system will not allow the same filename. To avoid this clash, the present invention, the preferred file naming operation incorporates a further step which can be detailed as follows:

First calculate the filename as explained above. Once the binary filename is obtained convert to the eight character hexadecimal equivalent.

Next, take the decimal number of the current level or magnitude and subtract one (1) to result in a decimal magnitude modifier. Convert the decimal magnitude modifier into a four-bit binary magnitude modifier, and line these four bits up with the four hexadecimal "x" filename characters. Whenever a "1" appears in the binary magnitude modifier, the corresponding aligned "x" filename character is converted to a "mutant-hexadecimal" character, i.e., a decimal 16 value is added to convert the aligned filename character into a one of the "mutant-hexadecimal" characters in the character set of "G-V".

Conversions from a hexadecimal character to a "mutant-hexadecimal" character can be most readily made using the chart detailed above. As an example, if decimal 16 is added to the hex character "0" (Column 2), there is a conversion to the "mutant-hexadecimal" character "G" (Column 3). Similarly, is decimal 16 is added to the hex character "1" (Column 2), there is a conversion to the "mutant-hexadecimal" character "H" (Column 3). Similar discussion can be made for the remaining hex and "mutant-Hexadecimal" characters in the chart.

Once correspondingly aligned filename characters are converted to "mutant-hexadecimal", the resultant eight (8) characters correspond to the files unique filename.

The above processing will now be applied to the fourth (upper-rightmost) file of the second level 1310 (which was recently discussed above). The resultant binary filename:

0000 0000 0000 0000 0000 0000 0000 0000 is converted to the hex characters:

0 0 0 0 0 0 0 0.

The level or magnitude two (2) minus one (1) results in a decimal magnitude modifier of one (1). The decimal magnitude modifier is converted to the four-bit binary equivalent and is aligned with the "x" filename characters above, as follows:

0 0 0 1

Only the fourth bit of the binary magnitude modifier is a "1", so only the fourth "x" filename character needs to be converted to "mutant-hexadecimal". From the chart, the hexadecimal character "0" is shown to convert to a "mutant-hexadecimal" character "G". Thus, the unique filename which is assigned to the fourth (upper-leftmost) file of the second level 1310, is:

0 0 0 G 0 0 0 0.

In continuing the example to calculate the filename for the first (upper-right-quadrant) file of the second level 1310, it can be seen that this file is assigned the two-bit naming protocol "10". The first protocol bit is a "1" which indicates that the current (second from the left) "x" bit of the parent file's binary filename must be changed to a "1". In contrast, the second protocol bit is a "0", which indicates that the current (second from the left) "y" bit is maintained as "0" Thus the parent filename:

0000 0000 0000 0000 0000 0000 0000 0000 is converted to:

0100 0000 0000 0000 0000 0000 0000 0000 which results in the hex characters:

4 0 0 0 0 0 0 0.

The level or magnitude two (2) minus one (1) results in a decimal magnitude modifier of one (1). The decimal magnitude modifier is converted to the four-bit binary equivalent and is aligned with the "x" filename characters above, as follows:

0 0 0 1

Only the fourth bit of the binary magnitude modifier is a "1", so only the fourth "x" filename character needs to be converted to "mutant-hexadecimal". From the chart, the hexadecimal character "0" is shown to convert to a "mutant-hexadecimal" character "G". Thus, the unique filename which is assigned to the first (upper-right-quadrant) file of the second level 1310, is:

4 0 0 G 0 0 0 0.

Turning now to the second (lower-right-quadrant) file, this file is assigned the two-bit naming protocol "11". The first protocol bit is a "1" which indicates that the current (second from the left) "x" bit of the parent file's binary filename must be changed to a "1", and similarly, the second protocol bit is a "1", which indicates that the current (second from the left) "y" bit of the parent file's binary filename must be changed to a "1" Thus the parent filename:

0000 0000 0000 0000 0000 0000 0000 0000 is converted to:

0100 0000 0000 0000 0000 0000 0000 0000 which results in the hex characters:

4 0 0 0 4 0 0 0.

The level or magnitude two (2) minus one (1) results in a decimal magnitude modifier of one (1). The decimal magnitude modifier is converted to the four-bit binary equivalent and is aligned with the "x" filename characters above, as follows:

0 0 0 1

Only the fourth bit of the binary magnitude modifier is a "1", so only the fourth "x" filename character needs to be converted to "mutant-hexadecimal". From the chart, the hexadecimal character "0" is shown to convert to a "mutant-hexadecimal" character "G". Thus, the unique filename which is assigned to the second (lower-right-quadrant) file of the second level 1310, is:

4 0 0 G 4 0 0 0.

In applying the above operations to the third (lower-left-quadrant) file of the second level 1310, it can be easily calculated that the resultant filename is:

0 0 0 G 4 0 0 0.

The example of the file naming operation is further extended to the third level or magnitude, as this example is illustrative of both the use of the parent file's binary filename to calculate the descendent's filename, and the removal of "mutant-hexadecimal" conversions before calculating the descendent's filename.

In FIG. 13, the third (lower-right-quadrant) file of the second level 1310 is shown as being the parent of the four (4) quadrant files highlighted in the third level or magnitude 1320.

The discussion centers on the calculation of the unique filename for the second (lower-right-quadrant) file in the third level 1320. Before the parent filename can be used as the foundation for calculating the descendent's filename, all "mutant-hexadecimal" conversions must be removed. Thus the parent filename:

4 0 0 G 4 0 0 0.

is converted back to:

4 0 0 0 4 0 0 0.

which is further converted to the binary equivalent:

0100 0000 0000 0000 0100 0000 0000 0000

In continuing the calculation, this second (lower-right-quadrant) file is assigned the two-bit naming protocol "11". The first protocol bit is a "1" which indicates that the current (third from the left) "x" bit of the parent file's binary filename must be changed to a "1", and similarly, the second protocol bit is a "1", which indicates that the current (third from the left) "y" bit of the parent file's binary filename must be changed to a "1" Thus the parent filename:

0100 0000 0000 0000 0100 0000 0000 0000 is converted to:

0110 0000 0000 0000 0110 0000 0000 0000 which results in the hex characters:

6 0 0 0 6 0 0 0.

The level or magnitude three (3) minus one (1) results in a decimal magnitude modifier of two (2). The decimal magnitude modifier is converted to the four-bit binary equivalent and is aligned with the "x" filename characters above, as follows:

0 0 1 0

Only the third bit of the binary magnitude modifier is a "1", so only the third "x" filename character needs to be converted to "mutant-hexadecimal". From the chart the hexadecimal character "0" is shown to convert to a "mutant-hexadecimal" character "G". Thus, the unique filename which is assigned to the second (lower-right-quadrant) file of the third level 1320 is:

6 0 G 0 6 0 0 0.

The filenames for several additional third level files will be given to give the patent reader further practice.

In applying the above operations to the first (upper-right-quadrant) file of the third level 1320, it can be easily calculated that the resultant filename is:

6 0 G 0 4 0 0 0.

In applying the above operations to the third (lower-left-quadrant) file of the third level 1320, it can be easily calculated that the resultant filename is:

4 0 G 0 6 0 0 0.

Finally, in applying the above operations to the fourth (upper-left-quadrant) file of the third level 1320, it can be easily calculated that the resultant filename is:

4 0 G 0 4 0 0 0.

As a result of all of the foregoing teachings one skilled in the art should now be able to calculate the filename of any other of the 1.4 billion files which would be required to provide digital maps corresponding to sixteen (16) resolutions of any geographical area on earth. Furthermore, once a file is being accessed, by understanding the rules and operations of the file naming operation, one skilled in the are should be able to calculate any other related files, i.e., parent files, and brother/sister/cousin files.

While the unique approach for storing and accessing files in the pyramidal file structure has been particularly pointed out, further discussion is needed as to an additional advantageous feature of the present invention.

As mentioned previously, the creation of a digital database is a very tedious, time consuming and expensive process. Tremendous bodies of mapping data are available from many important mapping authorities, for example, the United States Geological Survey (USGS), Defense Mapping Agency (DMA), National Aeronautics and Space Administration (NASA), etc.

The maps and mapping information produced by the above recited agencies, is always based on well established mapping area divisions. As a few examples, the Defense Mapping Agency (DMA) produces maps and mapping information based on the following mapping areas: GNC maps which are 2°×2°; JNC maps which are 1°×1°; ONC maps which are 30'×30'; TPC maps which are 15'×15'; and JOG maps which are 7.5'×7.5'. As a further example, the United States Geological Survey (USGS) also produces maps and utilizes mapping information based on 15'×15' and 7.5'×7.5'.

In terms of both being able to easily utilize the mapping data produced by these agencies, and represent an attractive mapping system to these mapping agencies, it would be highly desirable for the mapping system of the present invention to be compatible with all of the mapping formats used by these respective agencies. Such is not the case when the mapping database is based on a graticule system corresponding to 360°.

If one were to apply multiple quadrant divisions to the 360°×180° flat map projection of the earth (FIG. 1), one would result in the following mapping area subdivisions:

| Level of quadrant div. | Resultant mapping area |
| --- | --- |
| 1 | (4) 180° × 90° |
| 2 | (16) 90° × 45° |
| 3 | (64) 45° × 22.5° |
| 4 | (256) 22.5° × 11.25° |
| 5 | (1024) 11.25° × 5.625° |
| etc. | |

Note that these mapping area subdivisions are very awkward, and do not match any of the well settled mapping area subdivisions. (It should be further noted that no better results are obtained if the initial map projection is imagined as being a 360°×360° square instead of a rectangle.)

In order to avoid these awkward mapping subdivisions, and result in quadrant divisions which precisely match widely used mapping area subdivisions, the present invention utilizes a unique initial map projection.

Figure 14:
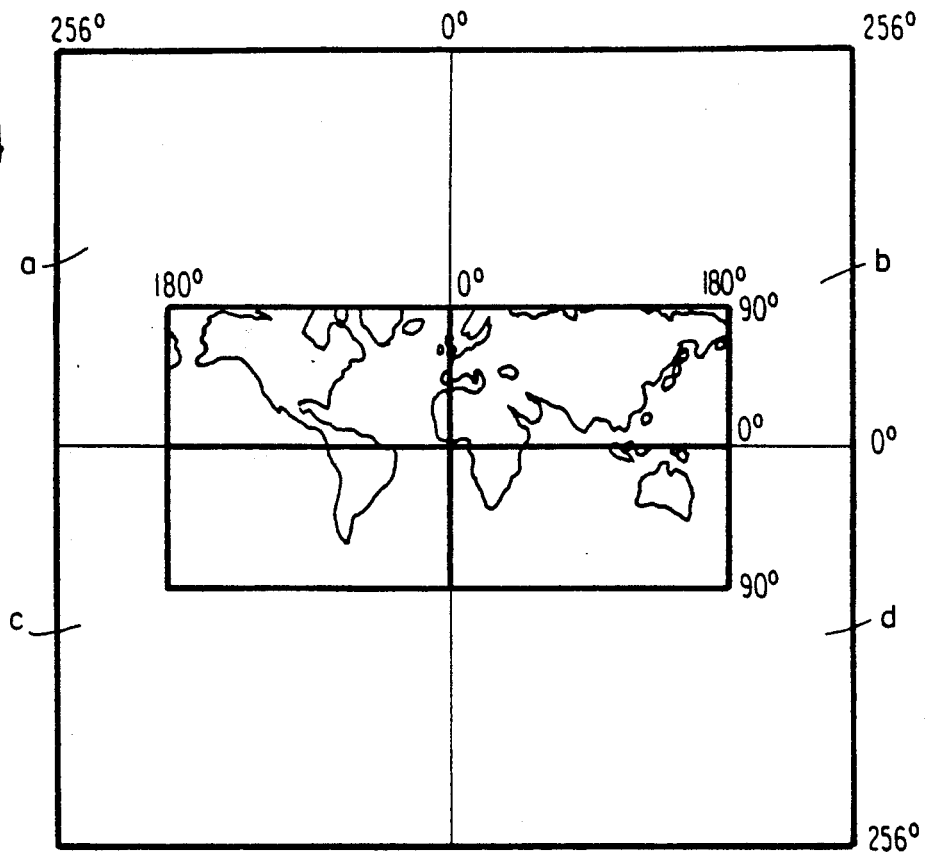
FIG. 14 is a plan view illustration of a 360° × 180° flat projection of the earth being impressed in the 512° × 512° mapping area of the present invention, with a first quadrant division dividing the mapping area into four equal 256° × 256° mapping areas.

More specifically, as can be seen in FIG. 14, the present invention initially begins with a unique 512°×512° initial map projection. Shown centered in the 512°×512° map projection is the now familiar 360°×180° flat projection of the surface of the earth. Although the 512°×512° projection initially appears awkward and a waste of map projection space, the great advantages which are resultant from the use of this projection will become more apparent in the discussions to follow.

To aid in this discussion, provided on the next page is a chart which details these important advantages as well as other useful information regarding the use of this map projection.

MAGNITUDE EQUIVALENCY CHART FOR DELORME PROJECTION
Chart assumes 69 statute miles per degree at equator

| MAG-NI-TUDE | Window Size without overlap | Ht of window statute miles | Ht of window kil-ometers | % windows per MAG | % windows/MAG w/polar compression | Pixel resolution 480 monitor (ft) | Data resolution (ft) 1024-based window | Equivalent Paper Map Scales | Size of paper map image at equator (in) |
|---|---|---|---|---|---|---|---|---|---|
| 1 | 256° × 256° | 17664 | 28421 | 4 | 4 | | 91080 | | |
| 2 | 128° × 128° | 8832 | 14211 | 8 | 8 | | 45540 | | |
| 3 | 64° × 64° | 4416 | 7105 | 24 | 24 | 48576 | 22770 | 1:100 million | 2.8 × 2.8 |
| 4 | 32° × 32° | 2208 | 3553 | 72 | 72 | 24288 | 11385 | 1:50 million | 2.8 × 2.8 |
| 5 | 16° × 16° | 1104 | 1776 | 288 | 288 | 12144 | 5693 | 1:30 million | 2.3 × 2.3 |
| 6 | 8° × 8° | 552 | 888 | 1152 | 858 | 6072 | 2846 | 1:16 million | 2.2 × 2.2 |
| 7 | 4° × 4° | 276 | 444 | 4232 | 3432 | 3036 | 1423 | 1:10 million | 1.7 × 1.7 |
| 8 | 2° × 2° | 138 | 222 | 16200 | 12808 | 1518 | 712 | 1:5 million | 1.7 × 1.7 |
| 9 | 1° × 1° | 69 | 111 | 64800 | 51210 | 759 | 356 | 1:2 million | 2.2 × 2.2 |
| 10 | 30' × 30' | 34.5 | 55.5 | 259000 | 204840 | 380 | 178 | 1:1 million | 2.2 × 2.2 |
| 11 | 15' × 15' | 17.25 | 27.8 | 1036800 | 813600 | 190 | 89 | 1:500,000 | 2.2 × 2.2 |
| 12 | 7.5' × 7.5' | 8.625 | 13.9 | 4147200 | 3277440 | 95 | 44 | 1:250,000 | 2.2 × 2.2 |
| 13 | 3.75' × 3.75' | 4.312 | 6.9 | 16588800 | 13109760 | 47.4 | 22 | 1:125,000 | 2.2 × 2.2 |
| | | | | | | | | 1:100,000 | 2.73 × 2.73 |
| | | | | | | | | 1:80,000 | 3.4 × 3.4 |
| 14 | 1.875' × 1.875' | 2.156 | 3.5 | 66355200 | 52439040 | 23.7 | 11.1 | 1:62,500 | 2.2 × 2.2 |
| | | | | | | | | 1:50,000 | 2.73 × 2.73 |
| | | | | | | | | 1:40,000 | 3.4 × 3.4 |
| 15 | 0.9375' × 0.9375' | 1.078 | 1.7 | 265420800 | 209756160 | 11.9 | 5.6 | 1:24,000 | 2.8 × 2.8 |
| | | | | | | | | 1:20,000 | 3.4 × 3.4 |
| 16 | 0.46875' × 0.46875' | 0.539 | 0.9 | 1016683200 | 839024640 | 5.9 | 2.8 | 1:12,000 | 2.8 × 2.8 |

The best way to see the advantages of the 512°×512° mapping projection, is to use it with the previously taught quadrant division and pyrimidal file structure to show how a mapping can provide digital maps of any geographical areas of the earth, with 16 levels or magnitudes of resolution. As it is slightly less complicated, the non-DOS file naming operation will be used in the discussion.

The digital mapping of the earth surfaces begins in FIG. 14. The visual perception of the earth surfaces is experienced as being centered, and occupying only a portion of the 512°×512° projection. A first quadrant division is applied to result in four equal 256°×256° mapping areas. The visual information in each of the areas is digitized and stored in a separate file. Thus, it can be seen that one would have to access four files a, b, c, d in order to reproduce a digital map corresponding to the earth surfaces as viewed from this "relative viewing position."

One skilled in the art, might, at this point, wonder if the massive blank portions of the 512°×512° projections result in large blank portions on the digital map display. The preferred embodiment avoid this phenomena, through a simple watchdog operation, i.e., the computer is programmed to keep track of longitudinal and latitudinal movements from an initial position of 0° longitude and 0° latitude, and the computer does not allow scrolling of the monitor display beyond 90° north or south.

As to side to side movements, the computer allows scrolling beyond 180° east or west by patching the appropriate data files together to perform a "wrap around" operation. Note that, with the knowledge of the logical file naming operation, the computer can quickly and easily calculate the appropriate file to access.

Before moving to the next level or magnitude of mapping resolution, it is beneficial to note the correspondence between our findings and the enties in the above-indicated chart.

In looking at the left-most column and tracing down to magnitude 1, note that the 256°×256° window size exactly matches our determination. Furthermore, note that our findings is also in agreement with the number of widows, i.e., 4. It is also interesting to note from the third column, that the height or "relative viewing position" of this magnitude or level would be 17,664 statute miles above the earth's surface.

Figure 15:
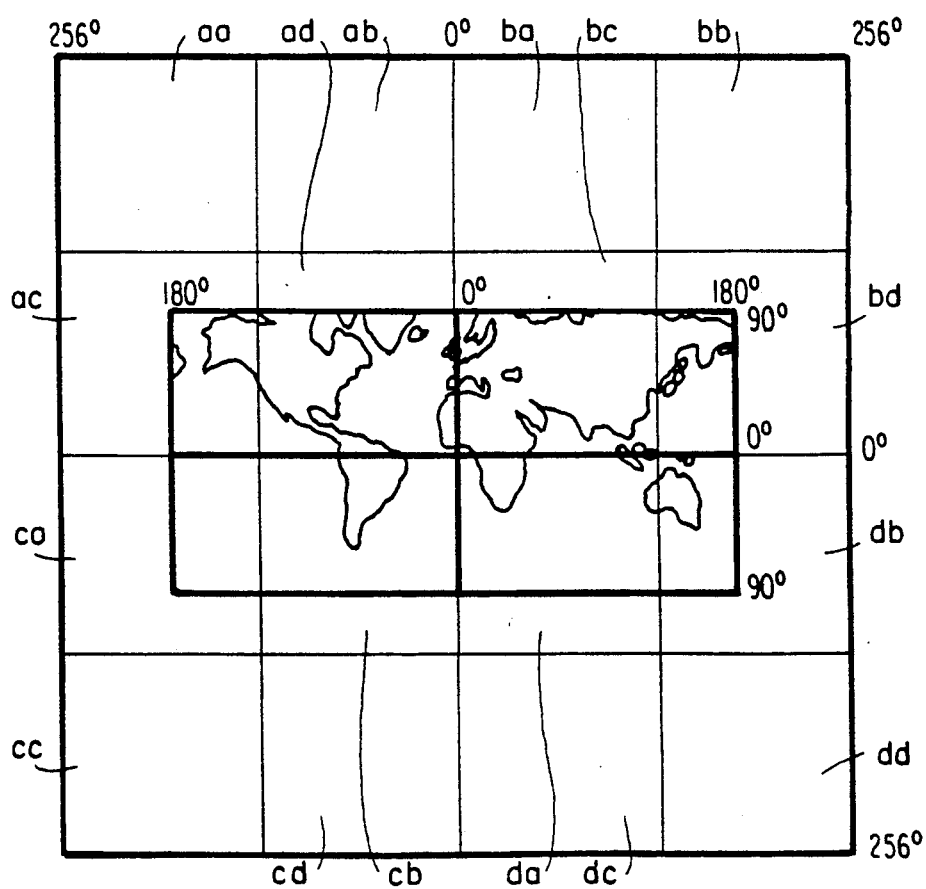
FIG. 15 is the same plan view illustration of FIG. 14, with a second quadrant division dividing the mapping area into 16 equal 128° × 128° mapping areas.
Figure 16:
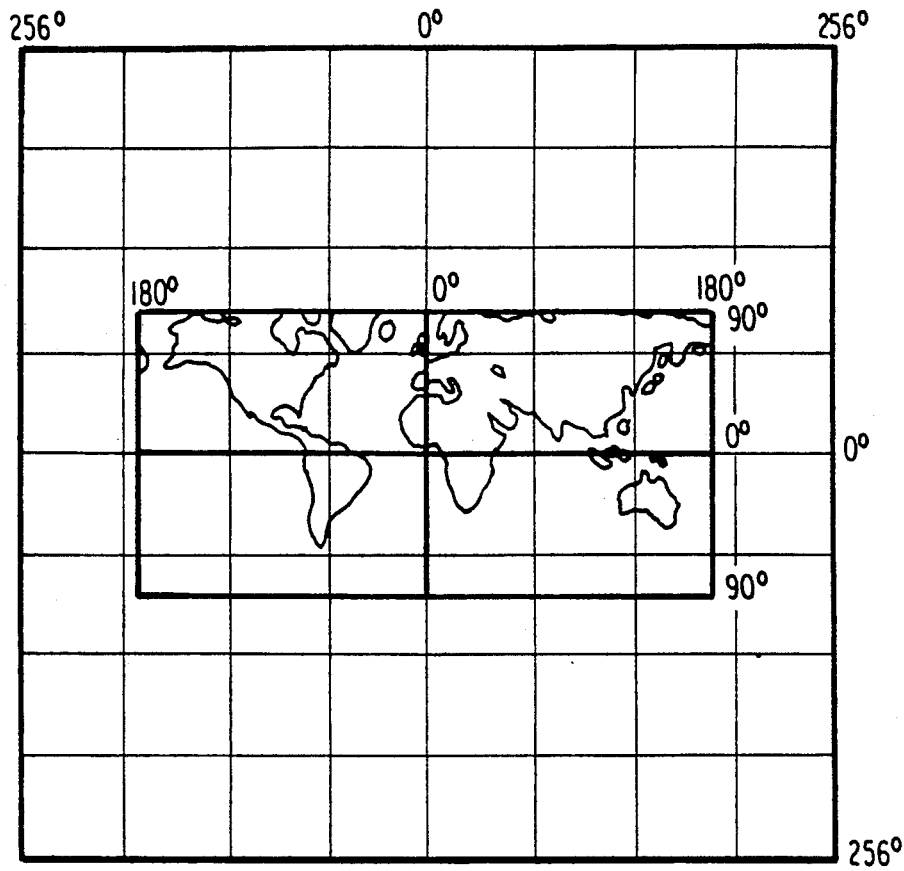
FIG. 16 is the same plan view illustration of FIG. 15, with a third quadrant division dividing the mapping area into 64 equal 64° × 64° mapping areas.

Turning now to the second level or magnitude or resolution (FIG. 15), a further quadrant division is applied, resulting in sixteen (16) mapping areas of 128°×128°. The respective filenames which are assigned to each of the mapping areas is shown. In viewing FIG. 15, note that there are eight (8) mapping areas which are not intersected by the earth's surface. In order to save valuable memory space, the preferred embodiment will ignore, and in fact will never create these files. Note that there is no use for these files as they do not contain any digital mapping data, nor will they ever have any descendents which hold mapping data. In order to implement this "file selectivity", the preferred embodiment again utilizes a watchdog approach. More specifically, as the computer already knows the degree (°) size of the earth's surface and the degree (°) size of each of the mapping areas (i.e., at each level or magnitude of resolution), it can be seen that the computer can easily calculate the filenames which will not intersect the earth's surface.

Again it is useful to correspond our findings with the entries in the chart.

Our findings are substantiated, as, at a magnitude of 2, the window size is shown as being 128°×128°, and the is shown to be eight (8) pertinent windows or files at this magnitude. Again, it is interesting to note that the height or "relative viewing position" of this window would be 8,832 statute miles above the earths surface.

It is important to note that, although the "relative viewing position" of each level or magnitude is moving closer to the earth, the visual perception of the earth (as seen in FIGS. 14–19 is not illustrated as getting larger with a greater degree of detail. This is because or the paper size limitations.

In the third level or magnitude of resolution (FIG. 16), a further quadrant division is applied, resulting in sixty-four (64) mapping areas of of 64°×64°. As the projection is beginning to represent a large plurality of mapping areas, the filenames have been omitted. However, it should be understood that the filename assigned to a respective file in this and subsequent degrees of resolution, can easily be calculated by following the previously described file naming operation. In this projection, it can be seen that 40 mapping areas or files are not used, resulting in 24 files which contain the digital mapping data of this resolution. Note that the observed window, and used files again correlates to the entries in the chart. Furthermore, it can be seen that the height or "relative viewing position" is at 4,416 statute miles above the earth.

Figure 17:
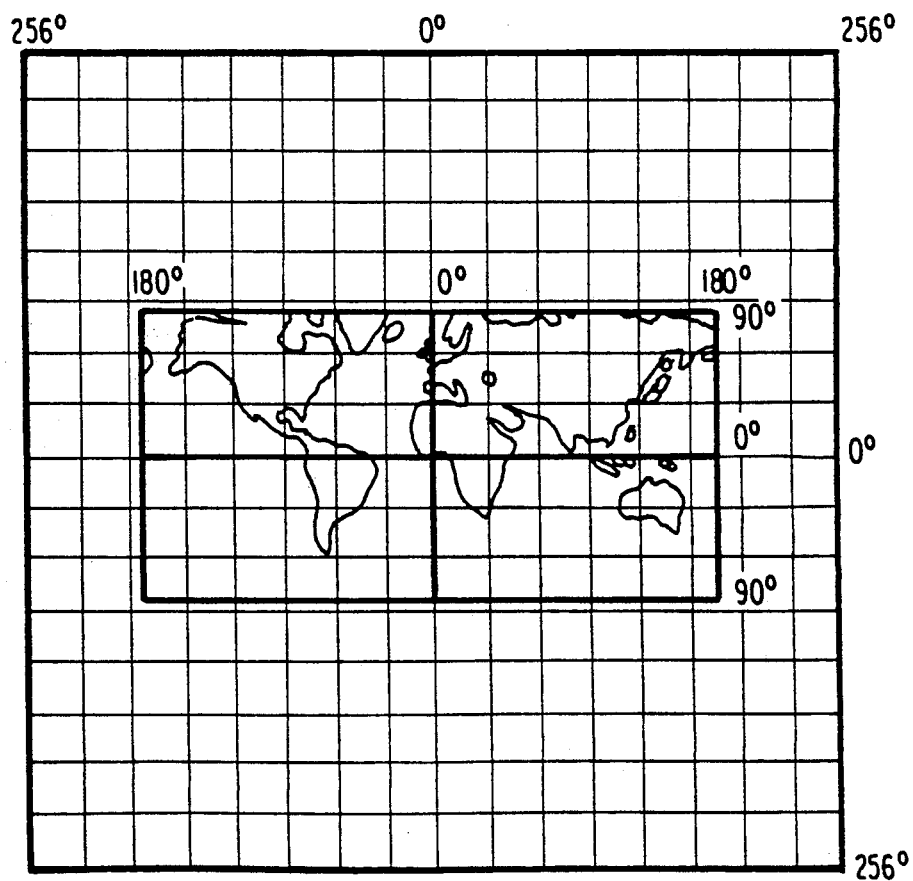
FIG. 17 is the same plan view illustration of FIG. 16, with a fourth quadrant division dividing the mapping area into 256 equal 32° × 32° mapping areas.
Figure 18:
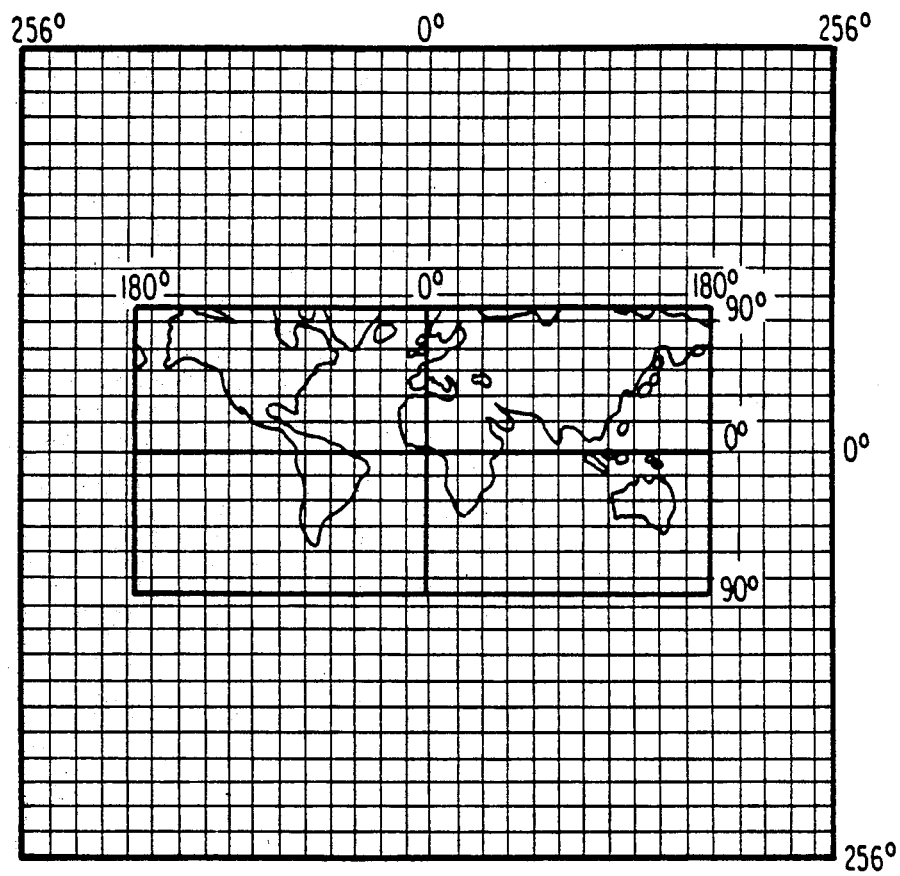
FIG. 18 is the same plan view illustration of FIG. 17, with a fifth quadrant division dividing the mapping area into 1024 equal 16° × 16° mapping areas.
Figure 19:
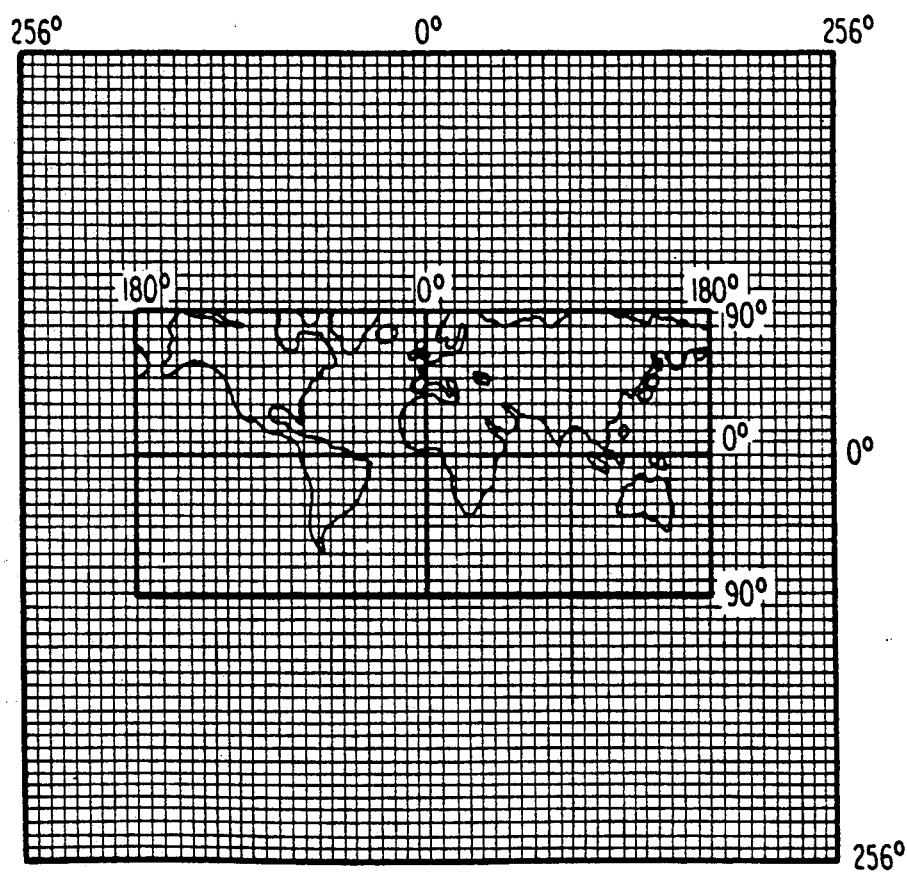
FIG. 19 is the same plan view illustration of FIG. 18, with a sixth quadrant division dividing the mapping area into 4096 equal 8° × 8° mapping areas.

Further quadrant divisions and the corresponding data can be seen in the FIGS. 17–19 and the chart. From the foregoing discussions, prior teachings, and data from the chart, one skilled in the art should be able to quickly appreciate that a mapping system can be constructed which can provide digital maps corresponding to a plurality of resolutions, of any geographical area of the world.

The chart can now be used to observe the tremendous advantage provided by the 512°×512° projection. In the second column of the chart, one can view the sizes of the mapping area divisions which are produced as a result of the continued quadrant division of the 512°×512° projection. One skilled in the mapping art will be able to fully appreciate that the resultant mapping area divisions exactly correspond to well settled and widely used mapping area formats.

Having described all of the important operations of the present invention, the following further conclusions, comments and teachings can be made.

With the mapping system of the present invention, the mapping data are structured at each magnitude or level into windows, frames or tiles representing subdivisions or partitions of the surface area at the specified magnitude. The windows, frames or tiles of all magnitudes for whatever resolution are structured to receive substantially the same amount or quantity of mapping data for segmented visual presentation of the mapping data by window.

As a further improvement, the mapping system of the present invention can further store and organize the mapping data is further organized into attributed or coded geographical and cultural features according to the classification and level or resolution or magnitude for presentation on the map display. Several examples of this was previously discussed with regard to the use of the filename extension. If this further improvement is used, the computer can be programmed and arranged for managing and accessing the mapping data, and excluding or including coded features in tiles of a particular magnitude according to the resolution and density of mapping data appropriate to the particular magnitude of the window. The selective display of attributed geographical and cultural features according to resolution maintains or limits the mapping data entered in each tile to no greater than a specified full complement of mapping data for whatever magnitude.

In reviewing the file naming operations which were described, one can see that the global map generating system data base structure relates tiles of the same magnitude by tile position coordinates that are keyed to the control corner of each tile and maintained in the name of the "tile-file". Continuity of same scale tiles is maintained during scrolling between adjacent or neighboring tiles in any direction. The new data base structure also relates tiles of different magnitudes by vertical lineage through successive magnitudes. Each tile of a higher magnitude and lower resolution is an "ancestor tile" encompassing a lineage of "descendant tiles" of lower magnitude and high resolution in the next lower magnitude. Thus the present invention permits accessing, displaying and presenting the structured mapping data by tile, by scrolling between adjacent or neighboring tiles of different magnitude in the same vertical lineage for varying the resolution.

In its simplest form the coordinate system is Cartesian, but the invention contemplates a variety of virtual tile manifestations of windowing the mapping data at each magnitude; for example: tilting the axes; scaling one axis relative to another; having one or both axes logarithmic; or rendering the coordinate space as non-Euclidean all together.

When dealing with vector or point information and gridded data, the most common method is to describe individual points as an x-y offset from the control corner of the tile. In this way the mapping data exist as pre-processed relative points on a spherical surface in a de-projected space. The mapping data can then be projected at the user interface with an application program. When projected, all data ultimately represent points of latitude and longitude. Tiles may also contain mapping data as variable offsets of arc in the x and y directions. The tile header may carry an internal descriptor defining what type of mapping data is contained. The application or display program may then decode and project the data to the appropriate latitude or longitude positions.

The map generating system contemplates storing analog mapping data in electronic mapping frames in which the raw analog data would be scanned and converted digitally to the tile structure and then later accessed and projected for the purpose of displaying continuous analog mapping data.

In the preferred example embodiment, the digital mapping data are structured by window or tile in a substantially rectangular configuration encompassing defined widths and heights in degrees of latitude and longitude for each magnitude. The mapping data representing each magnitude or level are stored in a de-projected format according to mapping on an imaginary cylindrical surface. For display of the maps, however, the data base manager accesses and presents the tiles in a projected form, according to the real configuration of the mapped surface, by varying the aspect ratio of latitude to longitude dimensions of the tiles according to the absolute position of the window on the surface area.

For example, for a spherical or spheroidal globe having an equator and poles, such as the earth, the mapping data are accessed and displayed by aspecting or narrowing the width in the west-east dimension of the tiles of the same magnitude, while scrolling from the equator to the poles. This is accomplished by altering the width of the tile relative to the height. In the graphics display of each window or tile on the monitor, the tiles are presented essentially as rectangles having an aspect ratio substantially equal to the center latitude encompassed by the tile. Thus, the width of the visual display windows is corrected in two respects. First, the overall width is corrected by aspecting to a narrower width, during scrolling in the direction of the poles, and to a wider width during scrolling in the direction of the equator. Second, the width of the tile is averaged to the center latitude width encompassed by the tile throughout the tile height to conserve the rectangular configuration. Alternatively, or in addition, further compensation may be provided by increasing the number of degrees of longitude encompassed by the tiles during scrolling from the equator to the poles to compensate for the compound curvature of the globe.

A feature and advantage of this new method and new system of map projection are that the dramatic and perverse distortion of the globe near the poles, introduced by the traditional and conventional Mercator projection is substantially eliminated. According to the invention, the compensating aspect ratio of latitudinal to longitudinal dimension of aspecting is a function of the distance from the equator, where the aspect ratio is one, to the poles where the aspect ratio approaches zero, all as described for example in Elements of Cartography, 4th edition, John Wiley & Sons (1978) by Arthur Robinson, Randall Sale and Joel Morrison.

Figure 20:
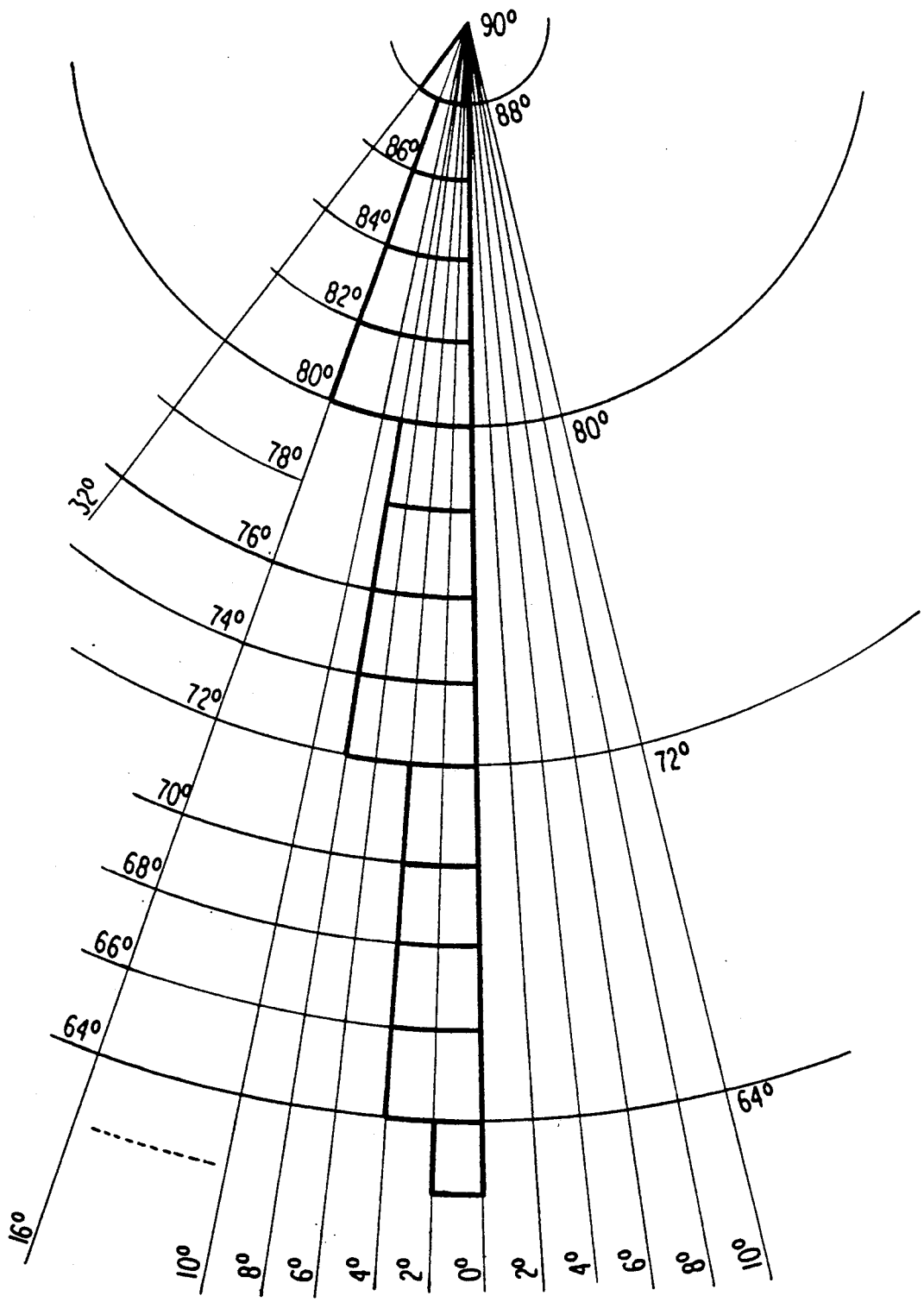
FIG. 20 is an illustration showing the application of polar compression at the 8th level or magnitude of resolution.

The new system contemplates "polar compression" (FIG. 20) in the following manner. Starting at 64 degrees latitude, the width of each tile doubles for every eight degrees of latitude. From 72 degrees to 80 degrees latitude, there are 4 degrees of longitude for 1 degree of latitude. From 80 degrees to 88 degrees latitude, it becomes eight to one, and from 88 degrees to the pole (90 degrees) it becomes 16 to one (see illustration of polar compression).

Another feature and advantage of the way in which the new map system and new projection handle polar mapping data are in the speed required to access and display polar data. The new polar compression method drastically minimizes tile or window seeks and standard I/O time. Also, without compressing the poles, the Creation/Edit Software would have to work on increasingly narrow tiles as the aspect ratio approached zero at the poles.

The invention embodies an entirely new cartographic organization for an automated atlas of the earth or other generally spherical or spheroidal globe with 360 degrees of longitude and 180 degrees of latitude, an equator and poles. The digital mapping data for the earth is structured on an imaginary surface space having 512 degrees of latitude and longitude. The imaginary 512 degree square surface represents the zero magnitude or root node at the highest level above the earth for a hierarchial type quadtree data base structure. In fact, the 512 degree square plane at the zero magnitude encompasses the entire earth in a single tile. The map of the earth, of course, fills only a portion of the root node window of 512 degrees square, and the remainder may be deemed imaginary space or "hyperspace".

In the preferred example embodiment from a zero magnitude virtual or imaginary space 512 degrees square, the data base structure of the global map generating system descends to a first magnitude of mapping data in four tiles, windows or quadrants, each comprising 256 degrees of latitude and longitude. Each quadrant represents mapping data for one-quarter of the earth thereby mapping 180 degrees of longitude and 90 degrees of latitude in the imaginary surface of the tile or frame comprising 256 degrees square, leaving excess imaginary space or "hyperspace". In the second magnitude the digital mapping data are virtually mapped and stored in an organization of 16 tiles or windows each comprising 128 degrees of latitude and longitude.

The map generating system supports two windowing formats, one based on the binary system of the 512 degree square zero magnitude root node with hyperspace and the other based on a system of a 360 degree square root node without hyperspace. A feature and advantage of the virtual 512 degree data base structure with hyperspace are that the tiles or windows to be displayed at respective magnitudes are consistent with conventional mapping scale divisions, for example, those followed by the United States Geological Survey (USGS), Defense Mapping Agency (DMA), National Aeronautics and Space Administration (NASA) and other government mapping agencies. Thus, typical mapping scale divisions of the USGS and military mapping agencies include scale divisions in the same range of 1 deg. 30 minutes, 15 minutes, 7.5 minutes of arc on the earth's surface. This common subdivision of mapping space does not exist in a data structure based on a 360 degree model without hyperspace (see chart).

Thus, according to the present invention, the world is represented in an assemblage of magnitudes, with each magnitude divided into adjacent tiles or windows on a virtual or imaginary two-dimensional plane or cylinder. At higher magnitudes the quadtree tiles of mapping data do not fill the imaginary projection space. However, from the seventh magnitude down, the mapping data fills a virtual closed cylinder, and no hyperspace exists at these levels.

In the preferred example embodiment the invention (running on a 16 bit computer) has sixteen magnitudes or levels (with extensions to 20 levels) representing sixteen altitudes or distances above the surface of the earth. At the lowest (16th) magnitude of highest resolution and closest to the earth, the data base structure contains over one billion tiles or windows (excluding hyperspace), each encompassing a tile height of approximately one half statute mile. At this level of resolution, one pixel on a monitor of 480 pixels in height represents approximately 6 feet on the ground. Mapping data are positioned within each tile using a 0 to 1023 offset coordinate structure, resulting in a data resolution of approximately 3 feet at this level of magnitude (see chart). The contemplated 20th magnitude tile or window height is approximately 175 feet, which results in a pixel resolution of about 4 inches on a monitor of 480 pixels in height and a data resolution of about 2 inches, when utilizing the 0 to 1023 offset coordinate structure. Alternatively, the map-generating system contemplates an extended offset from 10 bits (0 to 1023) to an offset of 16 bits (0 to 65,535). In this case, the extended 20th magnitude results in a data resolution of 3 hundredths of an inch.

For still more resolution, the map generating system contemplates 32 magnitudes on a 32 bit computer and representing 32 altitudes or distances about the surface of the earth. Each level of magnitude may define mapping data within each tile using a 32 bit offset coordinate structure, thereby giving relative mathematical accuracy to a billionth of an inch. In all practicality, 20 separate magnitudes or levels are more than sufficient to carry the necessary levels of resolution and accuracy.

The new invention provides users with the ability graphically to view mapping data from any part of the world-wide data base graphically on a monitor, either by entering coordinates and a level of zoom (or magnitude) on the keyboard or by "flying" to that location in the "step-zoom" mode using consecutive clicks of the mouse or other pointing device. Once a location has been chosen (this point becomes the user-defined screen center), the mapping software accesses all adjacent tiles needed to fill the entire view window of the monitor and, then, projects the data to the screen. Same scale scrolling is accomplished by simply choosing a new screen center and maintaining the same magnitude.

Vertical zooming up or down is accomplished by choosing another magnitude or level from the menu area with the pointing device or by directly entering location and magnitude on the keyboard. An advantage of this vertical lineage of tiles organized in a quadtree structure is that it affords the efficient and easily followed zooming continuity inherent in the present invention. Further discussion of such quadtree data organization is found in the article "The Quadtree and Related Hierarchical Data Structures", by Hannan Samet, Computer Surveys, Volume 16, No. 2, (June 1984), Pages 187 et seq.

The map-generating system also supports many types of descriptive information such as that contained in tabular or relational data bases. This descriptive information can be linked to the mapping data with a latitude and longitude coordinate position but may need to be displayed in alternate ways. Descriptive information is better suited for storage in a relational format and can be linked to the map with a "spatial hook".

In summary, the present invention provides a new automated world atlas and global map generating system having a multi-level hierarchial quadtree data base structure and a data base manager or controller which permits scrolling, through mapping tiles or windows of a particular magnitude, and zooming between magnitudes for varying resolution. While the data base organization is hierarchial between levels or magnitudes, it is relational within each level, resulting in a three dimensional network of mapping and descriptive information. The present invention also provides a new mapping projection that has similarities to the Mercator projection but eliminates drastic distortions near the poles for the purpose of presentation through a method of "aspecting" tile widths as a function of the latitudinal distance from the equator.

While the invention has been particularly shown and described with reference to the preferred embodiment thereof, it will be understood by those skilled in the art that various changes in form and details of the device and the method may be made therein without departing from the spirit and scope of the invention.

What is claimed is:

1. A new map projection for the Earth comprising a plurality of maps at a plurality of magnitudes or levels above the Earth, said map magnitudes comprising a hierarchy of magnitudes or levels from a first magnitude or highest magnitude or lowest resolution to a last magnitude or lowest magnitude of highest resolution, each map comprising a plurality of frames or windows encompassing defined degrees of longitude and latitude according to the respective map magnitude, said windows for each magnitude along the equator having an aspect ratio of approximately one, said aspect ratio for said windows of a given magnitude decreasing in the direction from the equator to the poles, said windows being of substantially rectangular configuration decreasing in width from the equator to the poles, said map of the first magnitude comprising four windows representing quadrants of the globe, each windows encompassing 256 degrees of longitude and latitude, said windows from different map magnitudes being related in a vertical hierarchy bearing the relationship to each other of a quadtree such that a window of a higher map magnitude of lower resolution comprises an ancestor window encompassing four descendant windows of the next lower map magnitude of lower resolution, said descendant windows having greater resolution and generally incorporating more cultural or geographic features than the ancestor window, said hierarchy of magnitudes comprising at least sixteen magnitudes including an eleventh magnitude comprising maps having windows encompassing 15 seconds of latitude and a twelfth magnitude comprising maps having windows encompassing 7.5 seconds of latitude so that the maps are consistent with conventional mapping scale divisions, 2. The map projection of claim 1 wherein the windows of generally rectangular configuration have a width throughout the window substantially equal to the width of the central latitude of the window.

3. The map projection of claim 1 wherein the generally rectangular configuration windows of each magnitude encompass defined degrees of longitude and latitude, said windows in the direction from the equator to the poles periodically encompassing greater degrees of longitude.

4. The map projection of claim 3 wherein the degrees of longitude encompassed by said windows of a particular magnitude double for each 8 degrees of latitude in the direction from the equator to the poles above 64 degrees latitude.

* * * * *